US012676476B2

(12) United States Patent
Yu et al.

(10) Patent No.: US 12,676,476 B2
(45) Date of Patent: Jul. 7, 2026

(54) ENERGY STORAGE POWER GENERATION SYSTEM AND CONTROL METHOD THEREOF

(71) Applicant: Huawei Digital Power Technologies Co., Ltd., Shenzhen (CN)

(72) Inventors: Xinyu Yu, Shanghai (CN); Kai Xin, Shanghai (CN); Yi Du, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/240,357

(22) Filed: Jun. 17, 2025

(65) Prior Publication Data

US 2026/0012017 A1     Jan. 8, 2026

(30) Foreign Application Priority Data

Jul. 3, 2024     (CN) .......................... 202410888889.5

(51) Int. Cl.
| | |
|---|---|
| H02J 3/001 | (2026.01) |
| H02J 3/32 | (2026.01) |
| H02J 3/466 | (2026.01) |
| H02M 7/00 | (2006.01) |
| H02M 7/487 | (2007.01) |

(52) U.S. Cl.
CPC ............... H02J 3/001 (2020.01); H02J 3/32 (2013.01); H02J 3/466 (2020.01); H02M 7/003 (2013.01); H02M 7/487 (2013.01)

(58) Field of Classification Search
CPC .... H02J 3/001; H02J 3/32; H02J 3/466; H02J 3/28; H02J 3/381; H02M 7/003; H02M 7/487; H02M 7/537
See application file for complete search history.

(56) References Cited

U.S. PATENT DOCUMENTS

| | | | | |
|---|---|---|---|---|
| 2014/0077595 A1* | 3/2014 | Kakuya | ............... | H01M 10/441 |
| | | | | 307/24 |
| 2017/0214251 A1* | 7/2017 | Dharmadhikari | ..... | H01M 10/44 |
| 2021/0194421 A1* | 6/2021 | Brown | ................ | H01M 10/425 |

FOREIGN PATENT DOCUMENTS

| | | |
|---|---|---|
| CN | 103346689 B | 5/2015 |
| CN | 106340902 B | 6/2018 |

\* cited by examiner

*Primary Examiner* — Rexford N Barnie
*Assistant Examiner* — Thai H Tran
(74) *Attorney, Agent, or Firm* — Maier & Maier, PLLC

(57) ABSTRACT

An energy storage power generation system and a control method thereof. When a transient fault occurs in the power grid, the plurality of power conversion systems may enter a transient-state operating mode from a steady-state operating mode, and a parallel expansion multiple of the energy storage power generation system is less than a transient overload multiple. In embodiments, a physical characteristic of transient overloading and a short-time overload capability of the power conversion system are fully used, and the power grid is supported when a power grid fault is detected. This solution simplifies an architecture of the system and increases efficiency of the system. It is easy to understand that because a quantity of power conversion systems is reduced and costs of the system are also reduced.

20 Claims, 16 Drawing Sheets

ENERGY STORAGE POWER GENERATION SYSTEM AND CONTROL METHOD THEREOF

CROSS-REFERENCE TO RELATED APPLICATION

This application claims priority to Chinese Patent Application No. 202410888889.5, filed on Jul. 3, 2024, which is hereby incorporated by reference in its entirety.

TECHNICAL FIELD

The embodiments relate to the field of power electronics, and to an energy storage power generation system and a control method.

BACKGROUND

With continuous development and application of new energy-based power generation systems, grid-connected new energy-based power generation systems, typically represented by photovoltaic power generation systems and wind power generation systems, account for an increasing proportion in power systems. As a proportion of a new energy installed capacity in the power system increases, system inertia of the power system and a short-circuit current that can be provided by the power system gradually decrease, and an instability risk of the power system is increasing.

A converter grid-forming control technology can simulate a control characteristic of a synchronous generator, to enhance a capability of a power generation/power supply device to connect to a weak power grid, thereby improving system inertia and stability of the power system. Generally, a stronger transient current overload capability of a converter grid-forming system indicates better grid stability performance of the converter grid-forming system.

When a power grid instability fault like a short-circuit fault occurs in a power grid, a power conversion system grid-forming system, as a type of converter grid-forming system, needs to have a transient current overload capability. How to improve the transient current overload capability of the power conversion system grid-forming system to improve a capability of the power conversion system grid-forming system to support the power grid has become a focus of research and investment in the academia and the industry.

SUMMARY

The embodiments provide an energy storage power generation system and a control method thereof. According to the energy storage power generation system, a short-time overload capability of a semiconductor device inside a power conversion system can be fully used, to optimize an architecture design of the power conversion system of the energy storage power generation system, thereby simplifying the system, increasing working efficiency of the system, and reducing component costs of the system.

According to a first aspect, an embodiment includes an energy storage power generation system. The energy storage power generation system includes an energy storage container and a plurality of power conversion systems. The energy storage container includes a battery, configured to store electric energy. Direct-current side ports of the plurality of power conversion systems are connected to the energy storage container, alternating-current side ports of the plurality of power conversion systems are connected in parallel and are configured to connect to a power grid, and the plurality of power conversion systems are configured to implement current conversion between the energy storage container and the power grid. The plurality of power conversion systems are configured to: enter a steady-state operating mode when a preset condition is met, or enter a transient-state operating mode from the steady-state operating mode when the preset condition is not met. The preset condition is that the following three conditions are met at the same time, and the three conditions include: a voltage of the power grid is within a preset voltage range, a frequency of the power grid is within a preset frequency range, and a change rate of the frequency of the power grid is less than or equal to a frequency change rate threshold. An active power output by the plurality of power conversion systems in the steady-state operating mode is less than an active power output by the plurality of power conversion systems in the transient-state operating mode, and an apparent power output by the plurality of power conversion systems in the steady-state operating mode is less than an apparent power output by the plurality of power conversion systems in the transient-state operating mode. A ratio of a sum of rated powers of the plurality of power conversion systems to a rated power of the energy storage container is m, and a ratio of a valid value of a sum of currents output by the plurality of power conversion systems in the transient-state operating mode to a valid value of a sum of currents output by the plurality of power conversion systems at the rated powers in the steady-state operating mode is n, where m is less than n, and m is greater than 1.

In this embodiment, compared with an energy storage power generation system that does not need to support a power grid, in order to enable the energy storage power generation system to have a capability of supporting the power grid, a quantity of power conversion systems needs to be expanded. In this embodiment, a parallel expansion multiple of the energy storage power generation system is required to be less than a transient overload multiple. In this design or implementation, the power conversion system is in overload operation during transient overloading of the energy storage power generation system. This is possible due to the following reasons. In this design or implementation, first, it is considered that duration of the transient overloading of the energy storage power generation system can be very short. Therefore, even if the power conversion system is in overload operation during transient overloading, the power conversion system can quickly recover normal operation after the energy storage power generation system quickly recovers, in other words, the power conversion system quickly exits an overload state. In addition, a semiconductor device inside the power conversion system has a specific short-time overload capability, and the short-time overload capability can completely ensure that the power conversion system safely survives the foregoing overload operating state with a very short time. In addition, according to this solution, a voltage and a frequency of the power grid are monitored in real time to detect a power grid fault in a timely and accurate manner. When a transient overload fault occurs in the power grid, the power conversion system can quickly switch from the steady-state operating mode to the transient-state operating mode to support the power grid under various conditions. In this embodiment, a physical characteristic of the transient overloading and the short-time overload capability of the power conversion system are fully used, an architecture of the system is simplified, and efficiency of the system is increased. It is easy to understand that because the quantity of power conversion systems is reduced, costs of the system are also reduced. The solution is accurate and reliable, has good power grid supporting effect.

According to the first aspect, in a possible implementation, a circuit of the power conversion system includes a neutral point clamped (NPC) circuit, the NPC circuit includes: a direct current busbar; two capacitors, where the two capacitors are connected in series between a positive electrode of the direct current busbar and a negative electrode of the direct current busbar; a switching transistor bridge arm, where the switching transistor bridge arm is connected between the positive electrode of the direct current busbar and the negative electrode of the direct current busbar, and includes two outer switching transistors and a pair of inner switching transistors that are connected in series, the two switching transistors in the pair of inner switching transistors are connected in series, one of the two outer switching transistors is connected between the positive electrode of the direct current busbar and the pair of inner switching transistors, and the other of the two outer switching transistors is connected between the negative electrode of the direct current busbar and the pair of inner switching transistors; and a pair of diodes, where the two diodes in the pair of diodes are connected in series, two ends of the pair of diodes are respectively connected to two connection points of the two outer switching transistors and the pair of inner switching transistors, and a midpoint of the pair of diodes is connected to a midpoint of the two capacitors; and a through-current capability of either of the two outer switching transistors is less than a through-current capability of either of the pair of diodes.

In this implementation, the circuit of the power conversion system includes the NPC circuit, and the through-current capabilities of a first switching transistor and a fourth switching transistor are greater than through-current capabilities of a fifth diode and a sixth diode. This design or implementation can significantly enhance the short-time overload capability of the power conversion system, thereby enhancing reliability of operation of the energy storage power generation system during the transient overloading.

According to the first aspect, in a possible implementation, each switching transistor in the two outer switching transistors and the pair of inner switching transistors is connected in parallel to one body diode.

According to the first aspect, in a possible implementation, the energy storage power generation system includes a control interface, the control interface is used to set a steady-state maximum active scheduling power and a steady-state maximum apparent scheduling power of each power conversion system, the steady-state maximum active scheduling power is a maximum active power of each power conversion system when the energy storage power generation system is in the steady-state operating mode, and the steady-state maximum apparent scheduling power is a maximum apparent power of each power conversion system when the energy storage power generation system is in the steady-state operating mode. The steady-state maximum active scheduling power and the steady-state maximum apparent scheduling power are set for the power conversion system, so that a power of the power conversion system output when the energy storage power generation system is in a steady state can be controlled, to ensure that the power conversion system outputs the power as required, thereby maintaining continuous, stable, and reliable operation of the entire energy storage power generation system.

According to the first aspect, in a possible implementation, the steady-state maximum active scheduling power is a ratio of a maximum active scheduling power of the energy storage power generation system to a quantity of the plurality of power conversion systems when the energy storage power generation system is in the steady-state operating mode, and the steady-state maximum apparent scheduling power is a ratio of a maximum apparent scheduling power of the energy storage power generation system to the quantity of the plurality of power conversion systems when the energy storage power generation system is in the steady-state operating mode. An active scheduling power and an apparent scheduling power of a single power conversion system are determined by composition of the energy storage power generation system, and an operating parameter of the power conversion system matches an operating parameter of the entire energy storage power generation system, so that the solution can adapt to energy storage power generation systems in various scenarios, and has good flexibility and a wide application scope. According to this embodiment, continuous, stable, and reliable operation of the entire energy storage power generation system can be maintained.

According to the first aspect, in a possible implementation, the maximum active scheduling power of the energy storage power generation system or the maximum apparent scheduling power of the energy storage power generation system is the rated power of the energy storage container. A specific value is set, and the specific value is related to the energy storage container, thereby enhancing reliability of the energy storage power generation system.

According to the first aspect, in a possible implementation, the energy storage power generation system includes a control interface, the control interface is used to set a transient-state maximum active power and a transient-state maximum apparent power of each power conversion system, the transient-state maximum active power is a maximum active power of each power conversion system when the energy storage power generation system is in the transient-state operating mode, and the transient-state maximum apparent power is a maximum apparent power of each power conversion system when the energy storage power generation system is in the transient-state operating mode. The transient-state maximum active power and the transient-state maximum apparent power are set for the power conversion system, so that a power of the power conversion system output when the energy storage power generation system is in a transient overload state can be controlled, to ensure that the power conversion system outputs the power as required, thereby maintaining continuous, stable, and reliable operation of the entire energy storage power generation system.

According to the first aspect, in a possible implementation, the transient-state maximum active power is a ratio of a maximum active power of the energy storage power generation system to a quantity of the plurality of power conversion systems when the energy storage power generation system is in the transient-state operating mode, and the transient-state maximum apparent power is a ratio of a maximum apparent power of the energy storage power generation system to the quantity of the plurality of power conversion systems when the energy storage power generation system is in the transient-state operating mode. An active power and an apparent power of a single power conversion system are determined by composition of the energy storage power generation system, so that an operating parameter of the power conversion system in this embodiment matches an operating parameter of the entire energy storage power generation system. When the energy storage power generation system is transiently overloaded, the power conversion system can operate at full load or even overload, to maintain continuous, stable, and reliable operation of the entire energy storage power generation system.

According to the first aspect, in a possible implementation, the transient-state maximum active power of the energy storage power generation system or the transient-state maximum apparent power of the energy storage power generation system is the rated power of the energy storage container. A specific value is set, and the specific value is related to the energy storage container, thereby enhancing reliability of the energy storage power generation system.

According to the first aspect, in a possible implementation, the energy storage container includes a plurality of battery clusters and a plurality of cluster-level controllers, the plurality of battery clusters are connected to the plurality of cluster-level controllers in a one-to-one correspondence, and the cluster-level controllers are configured to perform direct current/direct current conversion. In this implementation, each battery cluster may be controlled by a corresponding cluster-level controller, so that a requirement on consistency of the battery clusters in this embodiment is low. Therefore, model selection and design of the battery cluster are easier, and battery cluster costs are lower accordingly.

According to the first aspect, in a possible implementation, each cluster-level controller includes a battery cluster side port and a power conversion system side port, the battery cluster side port is configured to connect to the battery cluster, and the power conversion system side port is configured to connect to the power conversion system; and battery cluster side ports of the plurality of cluster-level controllers are connected in parallel to each other to form a positive electrode and a negative electrode of the energy storage container, and the direct-current side ports of the plurality of power conversion systems are connected in parallel to each other and are connected to the positive electrode and the negative electrode of the energy storage container. In the architecture of the energy storage power generation system provided in this embodiment, because direct-current sides of the power conversion systems are connected in parallel, and alternating-current sides of the power conversion systems are also connected in parallel, in this embodiment, the power conversion system is very easy to expand. Therefore, this embodiment may be applied to countries or regions that have different requirements on the transient overload multiple for grid forming, and has a wide range of application scenarios.

According to the first aspect, in a possible implementation, each cluster-level controller includes a battery cluster side port and a power conversion system side port, the battery cluster side port is configured to connect to the battery cluster side port, and the power conversion system side port is configured to connect to the power conversion system; and the plurality of power conversion systems include a plurality of groups of power conversion systems, each group of power conversion systems includes at least two power conversion systems, direct-current side ports of the power conversion systems in each group of power conversion systems are connected in parallel to each other, and the plurality of groups of power conversion systems are respectively connected to the plurality of cluster-level controllers in a one-to-one correspondence. In the architecture of the energy storage power generation system provided in this embodiment, because direct-current sides of the power conversion systems are grouped and connected in parallel, and alternating-current sides of the power conversion systems are also connected in parallel, in this embodiment, the power conversion system is easy to expand. Therefore, this embodiment may be applied to countries or regions that have different requirements on the transient overload multiple for grid forming, and has a wide range of application scenarios.

According to a second aspect, an embodiment provides a control method for an energy storage power generation system. In the method, a plurality of power conversion systems are controlled to enter a steady-state operating mode when a preset condition is met, or to enter a transient-state operating mode from the steady-state operating mode when the preset condition is not met. The preset condition is that the following three conditions are met at the same time, and the three conditions include: a voltage of a power grid is within a preset voltage range, a frequency of the power grid is within a preset frequency range, and a change rate of the frequency of the power grid is less than or equal to a frequency change rate threshold. An active power output by the plurality of power conversion systems in the steady-state operating mode is less than an active power output by the plurality of power conversion systems in the transient-state operating mode, and an apparent power output by the plurality of power conversion systems in the steady-state operating mode is less than an apparent power output by the plurality of power conversion systems in the transient-state operating mode. A ratio of a sum of rated powers of the plurality of power conversion systems to a rated power of an energy storage container is m, and a ratio of a valid value of a sum of currents output by the plurality of power conversion systems in the transient-state operating mode to a valid value of a sum of currents output by the plurality of power conversion systems at the rated powers in the steady-state operating mode is n, where m is less than n, and m is greater than 1. The energy storage power generation system includes the energy storage container and the plurality of power conversion systems, where the energy storage container includes a battery, configured to store electric energy, direct-current side ports of the plurality of power conversion systems are connected to the energy storage container, alternating-current side ports of the plurality of power conversion systems are connected in parallel and are configured to connect to the power grid, and the plurality of power conversion systems are configured to implement current conversion between the energy storage container and the power grid.

In this embodiment, compared with an energy storage power generation system that does not need to support a power grid, to enable the energy storage power generation system in this embodiment to have a capability of supporting the power grid, a quantity of power conversion systems needs to be expanded. In this embodiment, a parallel expansion multiple of the energy storage power generation system is required to be less than a transient overload multiple. In this design or implementation, the power conversion system is in overload operation during transient overloading of the energy storage power generation system. This design or implementation is possible due to the following reasons. In this design or implementation, first, it is considered that duration of the transient overloading of the energy storage power generation system can be very short. Therefore, even if the power conversion system is in overload operation during transient overloading, the power conversion system can quickly recover normal operation after the energy storage power generation system quickly recovers, in other words, the power conversion system quickly exits an overload state. In addition, a semiconductor device inside the power conversion system has a specific short-time overload capability, and the short-time overload capability can completely ensure that the power conversion system safely survives the foregoing overload operating state with a very short time. In addition, according to this solution, a voltage and a frequency of the power grid are monitored in real time to detect a power grid fault in a timely and accurate manner. When a transient overload fault occurs in the power grid, the power conversion system can quickly switch from the steady-state operating mode to the transient-state operating mode to support the power grid under various conditions. Therefore, in this embodiment, a physical characteristic of the transient overloading and the short-time overload capability of the power conversion system are fully used, an architecture of the system is simplified, and efficiency of the system is increased. It is easy to understand that because the quantity of power conversion systems is reduced, costs of the system are also reduced. The solution is accurate and reliable and has good power grid supporting effect.

According to the second aspect, in a possible implementation, a control interface is used to set a steady-state maximum active scheduling power and a steady-state maximum apparent scheduling power of each power conversion system, the steady-state maximum active scheduling power is a maximum active power of each power conversion system when the energy storage power generation system is in the steady-state operating mode, the steady-state maximum apparent scheduling power is a maximum apparent power of each power conversion system when the energy storage power generation system is in the steady-state operating mode, and the energy storage power generation system includes the control interface. The steady-state maximum active scheduling power and the steady-state maximum apparent scheduling power are set for the power conversion system, so that a power of the power conversion system output when the energy storage power generation system is in a steady state can be controlled, to ensure that the power conversion system outputs the power as required, thereby maintaining continuous, stable, and reliable operation of the entire energy storage power generation system.

According to the second aspect, in a possible implementation, the steady-state maximum active scheduling power is a ratio of the rated power of the energy storage container to a quantity of the plurality of power conversion systems, and the steady-state maximum apparent scheduling power is a ratio of a scheduling apparent power of the energy storage power generation system to the quantity of the plurality of power conversion systems when the energy storage power generation system is in the steady-state operating mode. A specific value is set, so that an operating parameter of the power conversion system in this embodiment matches an operating parameter of the entire energy storage power generation system, to maintain continuous, stable, and reliable operation of the entire energy storage power generation system.

According to the second aspect, in a possible implementation, a control interface is used to set a transient-state maximum active power and a transient-state maximum apparent power of each power conversion system, the transient-state maximum active power is a maximum active power of each power conversion system when the energy storage power generation system is in the transient-state operating mode, and the transient-state maximum apparent power is a maximum apparent power of each power conversion system when the energy storage power generation system is in the transient-state operating mode. The transient-state maximum active power and the transient-state maximum apparent power are set for the power conversion system, so that a power of the power conversion system output when the energy storage power generation system is in a transient overload state can be controlled, to ensure that the power conversion system outputs the power as required, thereby maintaining continuous, stable, and reliable operation of the entire energy storage power generation system.

According to the second aspect, in a possible implementation, the transient-state maximum active power is a ratio of the rated power of the energy storage container to a quantity of the plurality of power conversion systems, and the transient-state maximum apparent power is a ratio of an apparent scheduling power of the energy storage power generation system to the quantity of the plurality of power conversion systems when the energy storage power generation system is in the transient-state operating mode. An active power and an apparent power of a single power conversion system are determined by composition of the energy storage power generation system, so that an operating parameter of the power conversion system in this embodiment matches an operating parameter of the entire energy storage power generation system. When the energy storage power generation system is transiently overloaded, the power conversion system can operate at full load or even overload, to maintain continuous, stable, and reliable operation of the entire energy storage power generation system.

According to the second aspect, in a possible implementation, the energy storage container includes a plurality of battery clusters and a plurality of cluster-level controllers, the plurality of battery clusters are connected to the plurality of cluster-level controllers in a one-to-one correspondence, and the cluster-level controllers are configured to perform direct current/direct current conversion. In this implementation, each battery cluster may be controlled by a corresponding cluster-level controller, so that a requirement on consistency of the battery clusters in this embodiment is low. Therefore, model selection and design of the battery cluster are easier, and battery cluster costs are lower accordingly.

According to the second aspect, in a possible implementation, each cluster-level controller includes a battery cluster side port and a power conversion system side port, the battery cluster side port is configured to connect to the battery cluster, and the power conversion system side port is configured to connect to the power conversion system; and battery cluster side ports of the plurality of cluster-level controllers are connected in parallel to each other to form a positive electrode and a negative electrode of the energy storage container, and the direct-current side ports of the plurality of power conversion systems are connected in parallel to each other and are connected to the positive electrode and the negative electrode of the energy storage container. In the architecture of the energy storage power generation system provided in this embodiment, because direct-current sides of the power conversion systems are connected in parallel, and alternating-current sides of the power conversion systems are also connected in parallel, in this embodiment, the power conversion system is very easy to expand. Therefore, this embodiment may be applied to countries or regions that have different requirements on the transient overload multiple for grid forming, and has a wide range of application scenarios.

According to the second aspect, in a possible implementation, each cluster-level controller includes a battery cluster side port and a power conversion system side port, the battery cluster side port is configured to connect to the battery cluster, and the power conversion system side port is configured to connect to the power conversion system; and the plurality of power conversion systems include a plurality of groups of power conversion systems, each group of power conversion systems includes at least two power conversion systems, direct-current side ports of the power conversion systems in each group of power conversion systems are connected in parallel to each other, and the plurality of groups of power conversion systems are respectively connected to the plurality of cluster-level controllers in a one-to-one correspondence. In the architecture of the energy storage power generation system provided in this embodiment, because direct-current sides of the power conversion systems are grouped and connected in parallel, and alternating-current sides of the power conversion systems are also connected in parallel, in this embodiment, the power conversion system is easy to expand. Therefore, this embodiment may be applied to countries or regions that have different requirements on the transient overload multiple for grid forming, and has a wide range of application scenarios.

DETAILED DESCRIPTION OF EMBODIMENTS

Figure 1A:
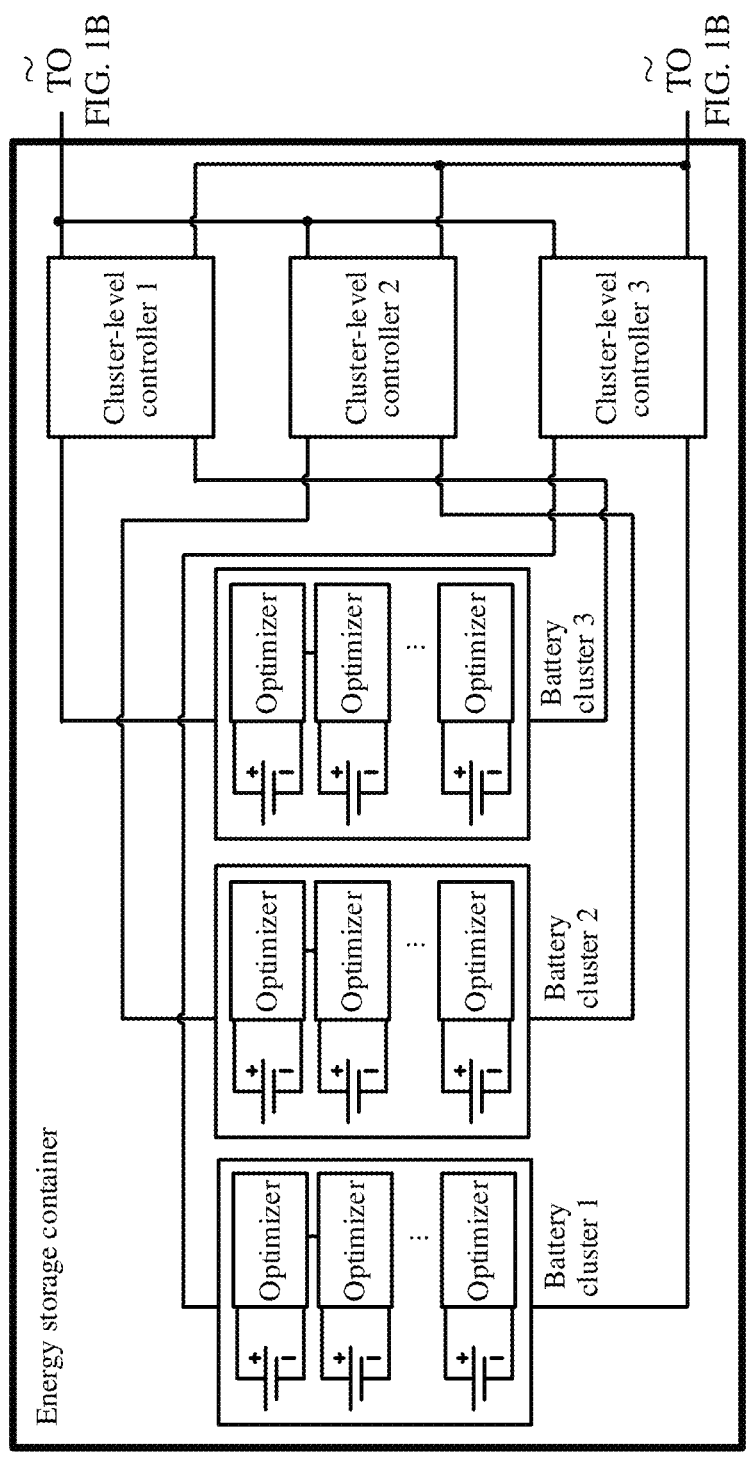
FIG. 1A and FIG. 1B are a diagram of an energy storage power generation system according to an embodiment.

The following describes solutions of the embodiments with reference to accompanying drawings.

In the embodiments, unless otherwise specified and limited, the term "connection" should be understood in a broad sense. For example, the "connection" may be a fixed connection, a detachable connection, an integration, a direct connection, or an indirect connection by using an intermediate medium. For ease of understanding, some proper nouns in the embodiments are first described.

PCS: A power conversion system can control charging and discharging processes of a battery and perform alternating current/direct current conversion, and can directly supply power to an alternating current load when there is no power grid, or can regulate an active power and a reactive power of a power grid when the power grid is available.

Grid forming: A grid-forming (GFM) control technology. Functions of an energy storage power generation system in a power grid include: providing active or reactive support for the system, improving a grid connection capability for new energy, participating in peak and frequency regulation, and supplying short-time power during a fault. The grid-forming control technology is used to control the power conversion system, so that stability of a new power system can be improved.

Transient state: A transient state of a power system refers to a process in which system parameters (such as a voltage, a current, and a frequency) change instantaneously after an unexpected fault or external disturbance (such as transient short-circuit and sudden load change) occurs in a system.

Steady state: A steady state of a power system refers to a state in which a voltage, a current, a frequency, a power angle, and a power of the power system all remain specific stable values in a normal operation state.

Transient overload multiple: Is a ratio of a valid value of a maximum output current of an energy storage power generation system in case of transient overloading to a valid value of a rated output current of the energy storage power generation system. The valid value of the maximum output current of the energy storage power generation system in case of the transient overloading is a valid value of a sum of currents output by a plurality of PCSs when a three-phase zero-voltage short-circuit occurs in a power grid. The valid value of the rated output current of the energy storage power generation system is a valid value of a sum of currents output by the plurality of PCSs when the power grid is in a steady state and the energy storage power generation system operates at a rated power.

Parallel expansion multiple: A ratio of a sum of rated powers of PCSs connected in parallel in an energy storage power generation system to a rated power of an energy storage container.

NPC (neutral point clamped): A three-level neutral point clamped circuit.

Through-current capability: Indicates an operating current that a power electronic device can allow for operation for a long time.

According to an energy storage power generation system provided in the embodiments, a short-time overload capability of a semiconductor device inside a power conversion system can be fully used, to optimize an architecture design of the power conversion system of the energy storage power generation system, thereby simplifying the system, increasing working efficiency of the system, and reducing component costs of the system. The following provides detailed descriptions of some embodiments.

Figure 1B:
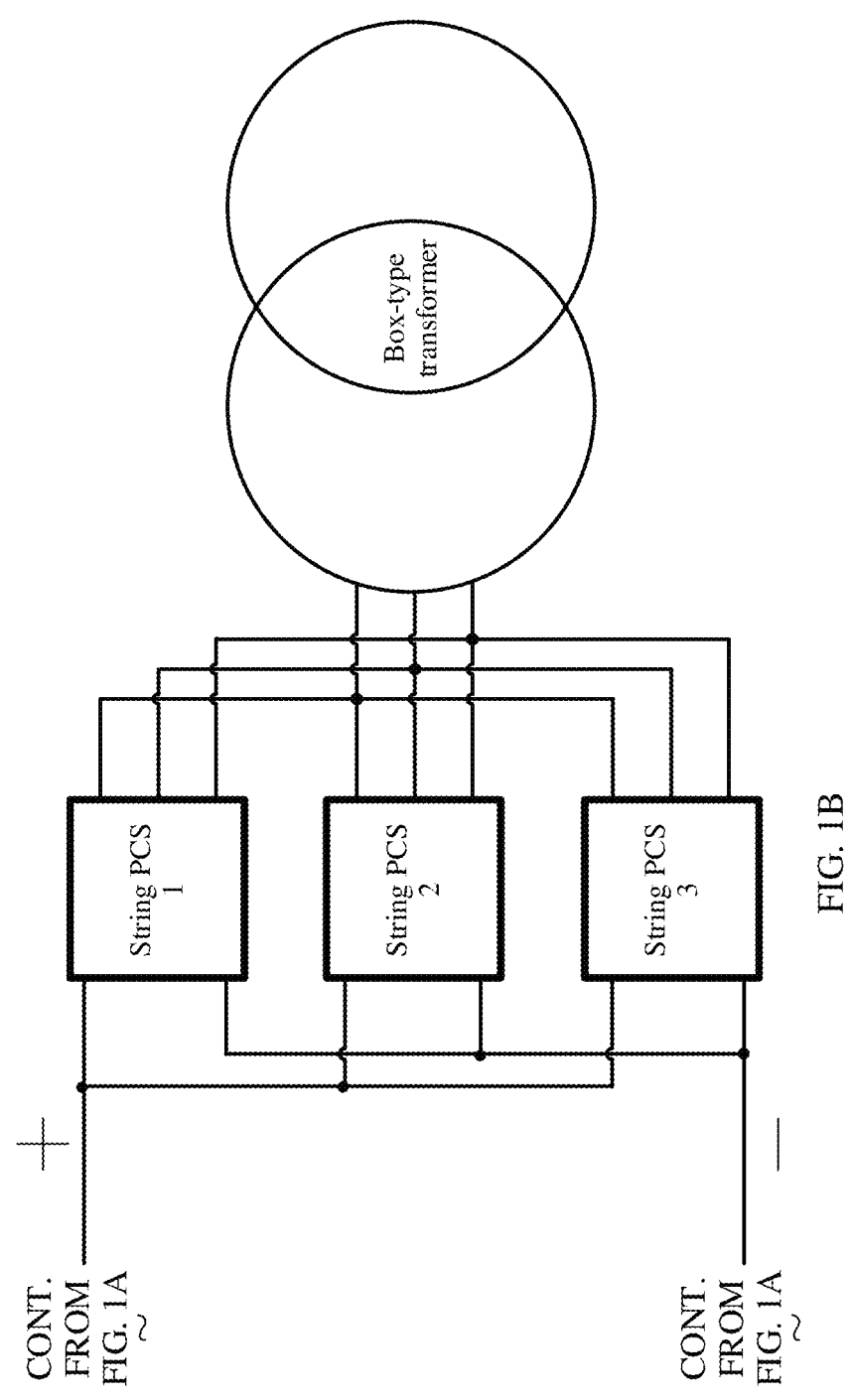

FIG. 1A and FIG. 1B are a diagram of an energy storage power generation system according to an embodiment. The energy storage power generation system includes an energy storage container, a plurality of PCSs, and a box-type transformer. The plurality of PCSs are connected between the energy storage container and the box-type transformer. When the energy storage power generation system discharges to a power grid, the energy storage container, as a direct current power supply, outputs a direct current to the plurality of PCSs. The plurality of PCSs convert the direct current into an alternating current, and then transmits the alternating current to the box-type transformer. In some embodiments, because a voltage of the power grid (not shown in FIG. 1B) is high, the alternating current needs to be boosted by the box-type transformer before being transmitted to the power grid. When the power grid charges the energy storage power generation system, an electric energy conversion process is just opposite to the foregoing discharge process. The box-type transformer, as an alternating

| current power supply, steps down an alternating current from the power grid and transmits the alternating current to the plurality of PCSs. The plurality of PCSs convert the alternating current into a direct current, and then transmit the direct current to the energy storage container. Then the direct current is stored by a battery in the energy storage container. Further, in the energy storage power generation system provided in this embodiment, the energy storage container includes three battery clusters: a battery cluster 1, a battery cluster 2, and a battery cluster 3, and the energy storage container further includes three cluster-level controllers: a cluster-level controller 1, a cluster-level controller 2, and a cluster-level controller 3. The three battery clusters are respectively connected to the three cluster-level controllers in a one-to-one correspondence, and the three cluster-level controllers are further connected to the plurality of PCSs. For ease of description, a port that is of the cluster-level controller and that is connected to the battery cluster is denoted as a battery cluster side port of the cluster-level controller, and ports that are of the cluster-level controllers and that are connected to the plurality of PCSs are denoted as PCS side ports of the cluster-level controller. In this embodiment, battery cluster side ports of the three cluster-level controllers are respectively connected to positive and negative electrodes of the three battery clusters, and PCS side ports of the three cluster-level controllers are connected in parallel. In other words, positive electrodes of the PCS side ports of the three cluster-level controllers are connected to each other to form a positive electrode of the energy storage container, and negative electrodes of the PCS side ports of the three cluster-level controllers are connected to each other to form a negative electrode of the energy storage container. Each cluster-level controller may regulate a voltage or a current of a battery cluster connected to the cluster-level controller. In view of this, in this embodiment, a requirement on consistency of included battery clusters is not high, and model selection and design of the battery cluster are easier. Direct-current side ports of the three PCSs are all connected in parallel to the positive electrode and the negative electrode of the energy storage container, and alternating-current side ports of the three PCSs are also connected in parallel to each other, to form a three-phase output port connected to the box-type transformer. In this PCS connection manner, for a scenario in which power expansion is required for the energy storage power generation system, the PCS is also easy to expand.

In this embodiment, both battery model selection and design and PCS expansion are easy, which is very conducive to designing or reconstructing the energy storage power generation system in different power grid conditions. In addition, each battery cluster includes a plurality of batteries and a plurality of optimizers, and the optimizer may also perform direct current/direct current conversion on an output or an input of the battery, to further manage power consumption of the battery cluster in a refined manner, and lower a design requirement for battery consistency.

After the energy storage power generation system is connected to a power system, when the power system operates in a transient state, the energy storage power generation system also operates in a transient state. When the power system operates in a steady state, the energy storage power generation system also operates in a steady state.

When the energy storage power generation system provided in the foregoing embodiment is used to form a grid-forming system, requirements of different countries or regions for an overload capability of the grid-forming system need to be met. To facilitate description of a principle of the solutions of the embodiments, the following content is described by using an example in which the grid-forming system needs to have three times an overload capability. In other words, the following transient overload multiples are all equal to 3. It should be understood that, during actual application, a specific value of the overload capability is not limited thereto, the transient overload multiple can be set to a value other than 3 and can be adjusted based on the different countries or regions.

Figure 2A:
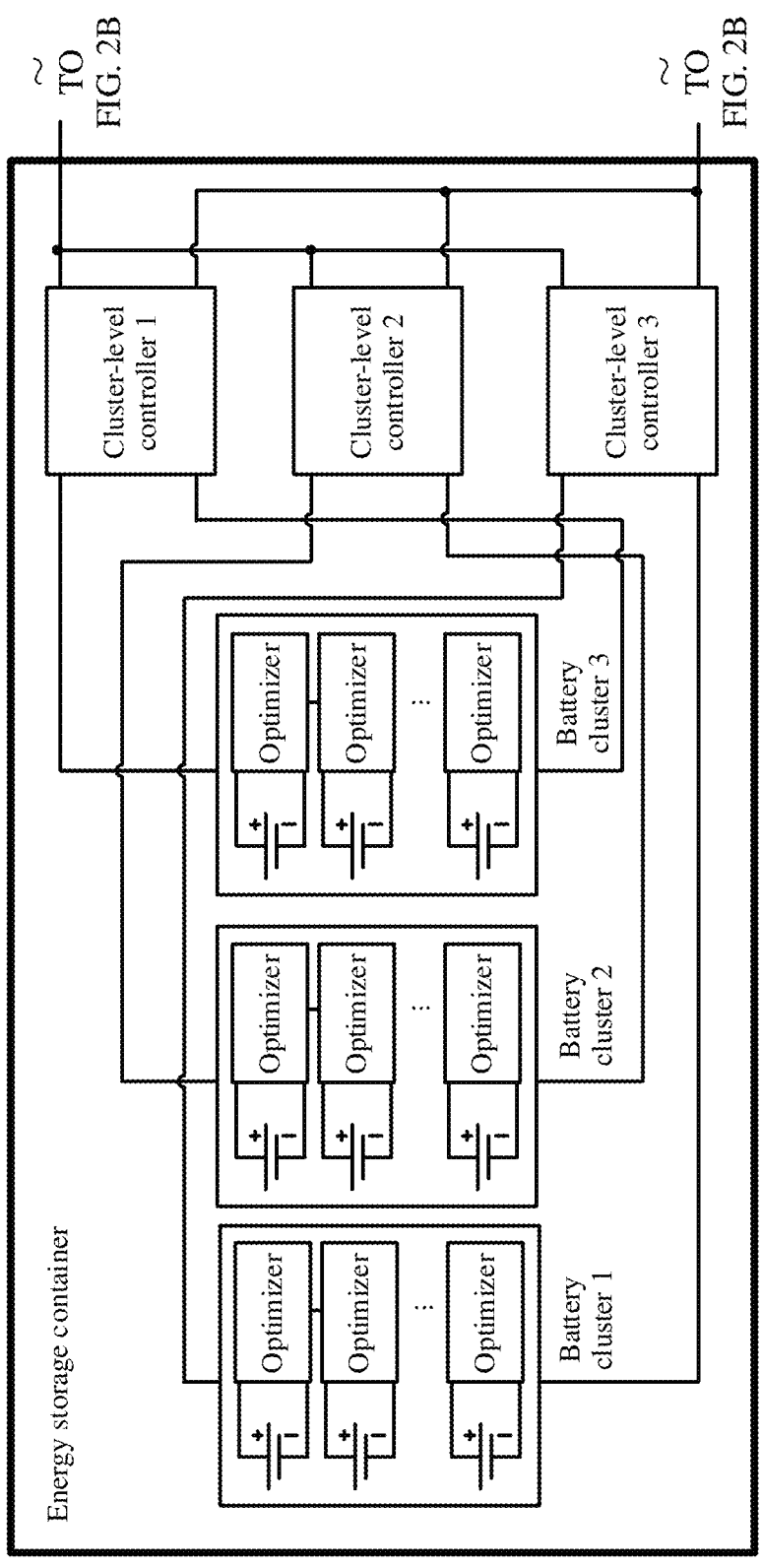
FIG. 2A and FIG. 2B are a diagram of another energy storage power generation system according to an embodiment.
Figure 2B:
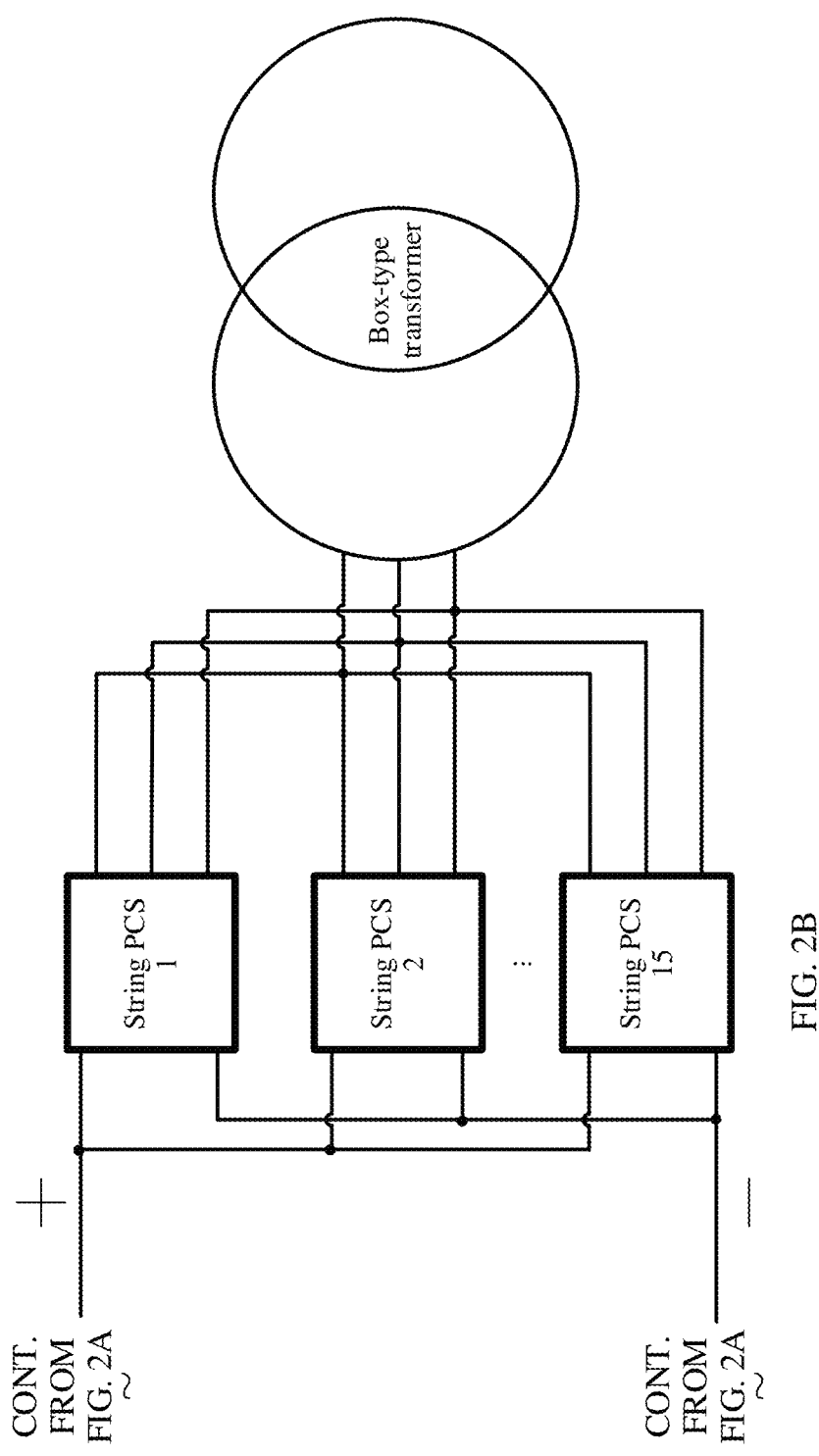

FIG. 2A and FIG. 2B are a diagram of another energy storage power generation system according to an embodiment. For ease of understanding, a specific power parameter of each device in the energy storage power generation system is described in this embodiment. In this embodiment, a rated power of an energy storage container is 1 MW, a rated power of a PCS is 0.2 MW, and a quantity of PCSs connected in parallel is 15. Therefore, in the energy storage power generation system, a parallel expansion multiple is $0.2*15/1=3$, and the parallel expansion multiple is exactly equal to a transient overload multiple. In this case, when a power grid is transiently overloaded, the energy storage power generation system can output three times an overload reactive current. In this embodiment, during the transient overloading of the power grid, a power of the PCS does not exceed the rated power of the PCS. Therefore, this embodiment is reliable, and there is a good power grid support capability for a transient fault that is of the power grid and that lasts for a long time. In this embodiment, the PCS of the energy storage power generation system can be conveniently expanded due to a parallel connection manner of alternating-current sides and direct-current sides of the PCSs, so that the energy storage power generation system has an overload capability required for grid forming, and ensures that the rated power of the PCS matches the rated power of the energy storage container, and no additional energy storage container is required.

Figure 9:
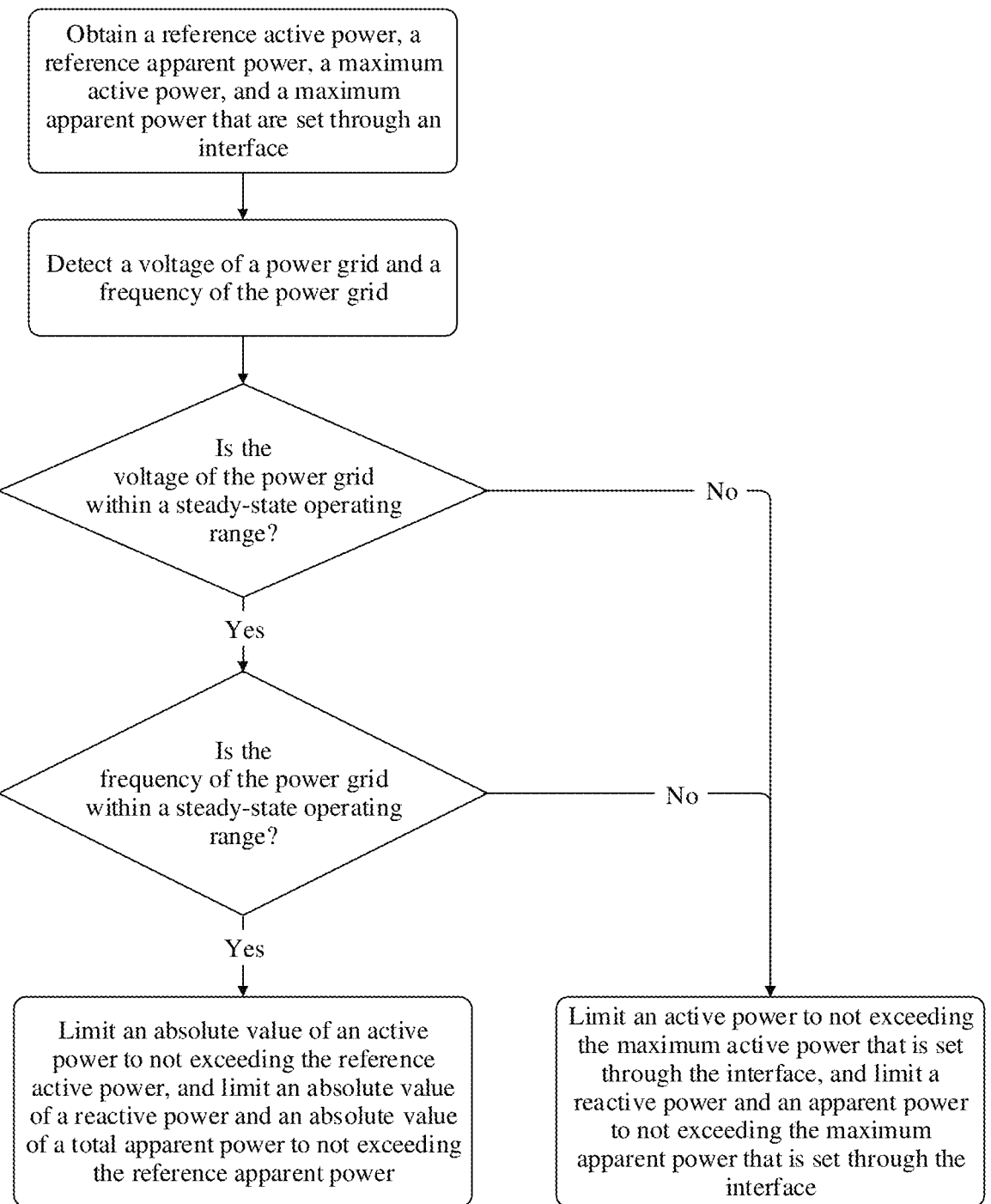
FIG. 9 is a flowchart of a control method for an energy storage power generation system according to an embodiment.

Refer to FIG. 2A and FIG. 2B and FIG. 9. When the energy storage power generation system shown in FIG. 2A and FIG. 2B is controlled to output an overload power, the following steps are performed:

(1) detect a voltage of the power grid and a frequency of the power grid in real time; and (2) when the voltage of the power grid and the frequency of the power grid each are within a steady-state operating range, limit an absolute value of an active power to not exceeding a reference active power that is set through an interface, and limit an absolute value of a reactive power and an absolute value of a total apparent power to not exceeding a reference apparent power that is set through an interface, where that the voltage of the power grid within a steady-state operating range means that the voltage of the power grid is within a voltage dead band range (that is, [rated voltage-voltage dead band, rated voltage+voltage dead band]) near a rated voltage of an energy storage system; and that the frequency of the power grid is within a steady-state operating range means that the frequency of the power grid is within a frequency dead band range (that is, [rated frequency-frequency dead band, rated frequency+frequency dead band]) near a rated frequency of the energy storage system, and an absolute value of a change rate of the frequency of the power grid is less than a frequency change rate dead band; or when an amplitude of the voltage of the power grid is within a transient-state operating range, limit an active power to not exceeding a maximum active power that is set through an interface, and when the frequency of the power grid is within a transient-state operating range, limit a reactive power and an apparent power to not exceeding a maximum apparent power that is set through an interface, where that the voltage of the power grid within a steady-state operating range means that the voltage of the power grid is within a voltage dead band range (that is, [rated voltage–voltage dead band, rated voltage+voltage dead band]) near a rated voltage of an energy storage system; and that the frequency of the power grid is within a steady-state operating range means that the frequency of the power grid is within a frequency dead band range (that is, [rated frequency–frequency dead band, rated frequency+frequency dead band]) near a rated frequency of the energy storage system, and an absolute value of a change rate of the frequency of the power grid is less than a frequency change rate dead band.

For example, for the energy storage power generation system shown in FIG. 2A and FIG. 2B, a valid value of a rated alternating-current line voltage is 800 V, and a rated frequency of the power grid is 50 Hz. It is preset that the voltage dead band is 40 V, the frequency dead band is 0.03 Hz, and the frequency change rate dead band is 0.1 Hz/s, and it is set through the interface that the reference active power is 66.7 kW, the reference apparent power is 66.7 kVA, the maximum active power is 83.3 kW, and the maximum apparent power is 200 kVA. In this case, when the voltage of the power grid ranges from 760 V to 840 V, the frequency of the power grid ranges from 49.97 Hz to 50.03 Hz, and the absolute value of the change rate of the frequency of the power grid is less than 0.1 Hz/s, each PCS in the energy storage power generation system determines, by detecting the voltage of the power grid and the frequency of the power grid, that the voltage of the power grid and the frequency of the power grid each are within the steady-state operating range. Therefore, each PCS limits the absolute value of the active power of the PCS to not exceeding 66.7 kW, and limits the reactive power and the apparent power of the PCS to not exceeding 66.7 kVA. When the voltage of the power grid is lower than 760 V or higher than 840 V, or the frequency of the power grid is lower than 49.97 Hz or higher than 50.03 Hz, or the absolute value of the change rate of frequency of the power grid exceeds 0.1 Hz/s, each PCS in the energy storage power generation system determines, by detecting the voltage of the power grid and the frequency of the power grid, that the voltage of the power grid and the frequency of the power grid each are within the transient-state operating range. Therefore, each PCS limits the absolute value of the active power of the PCS to not exceeding 83.3 kW, and limits the reactive power and the apparent power of the PCS to not exceeding 200 kVA.

In an actual scenario, an exception of power grid overload does not occur frequently, and duration of each occurrence is not long. The overload duration can be at a second level. This means that even if the parallel expansion multiple of the energy storage power generation system is slightly less than the transient overload multiple, a semiconductor device inside the PCS may be allowed to operate in an overload state for a short time due to a short-time overload capability of the semiconductor device inside the PCS and an optimal circuit design of the PCS. In this way, when the power grid is transiently overloaded, the energy storage power generation system can still operate stably and support the power grid.

Figure 3A:
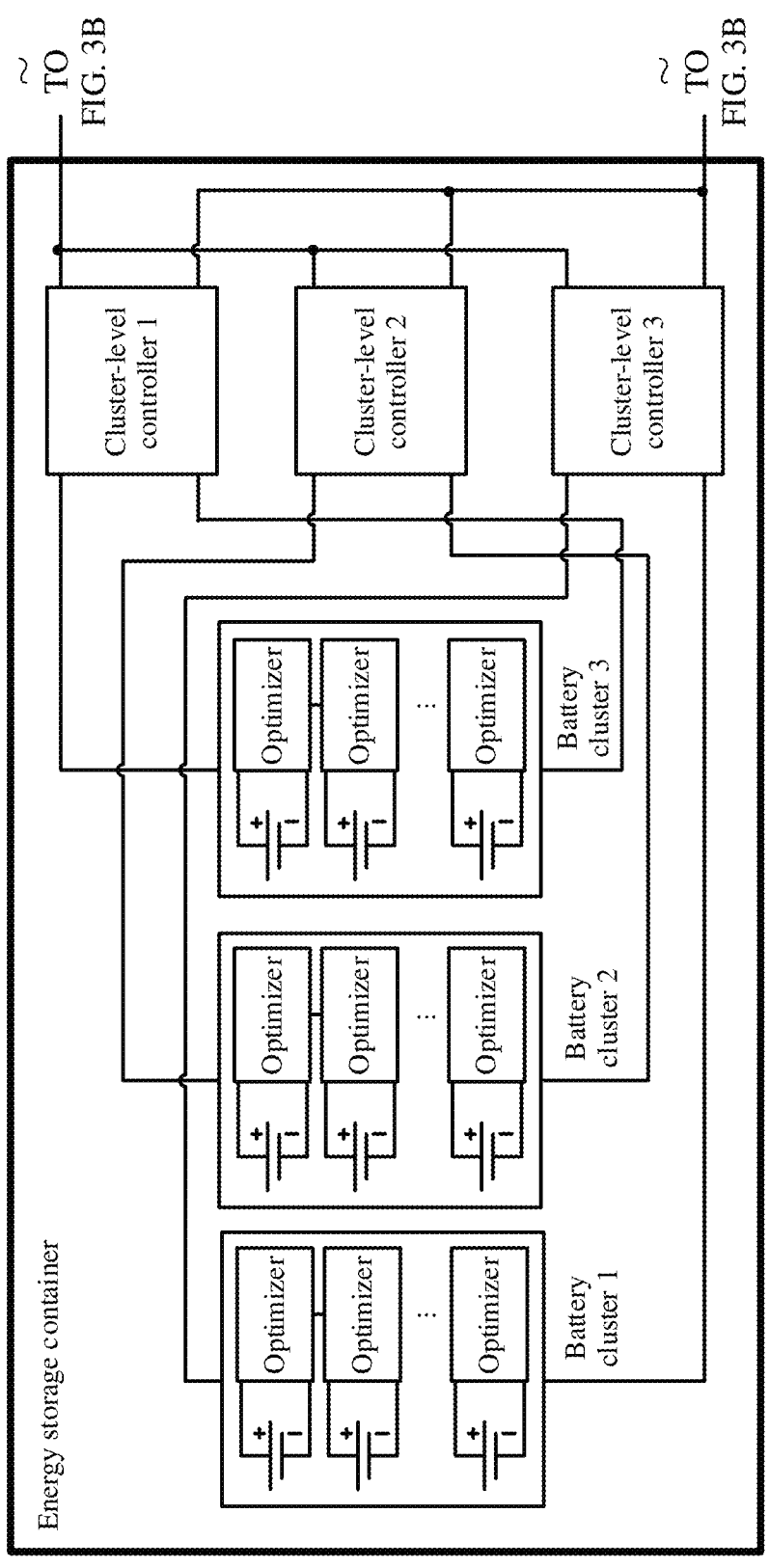
FIG. 3A and FIG. 3B are a diagram of another energy storage power generation system according to an embodiment.
Figure 3B:
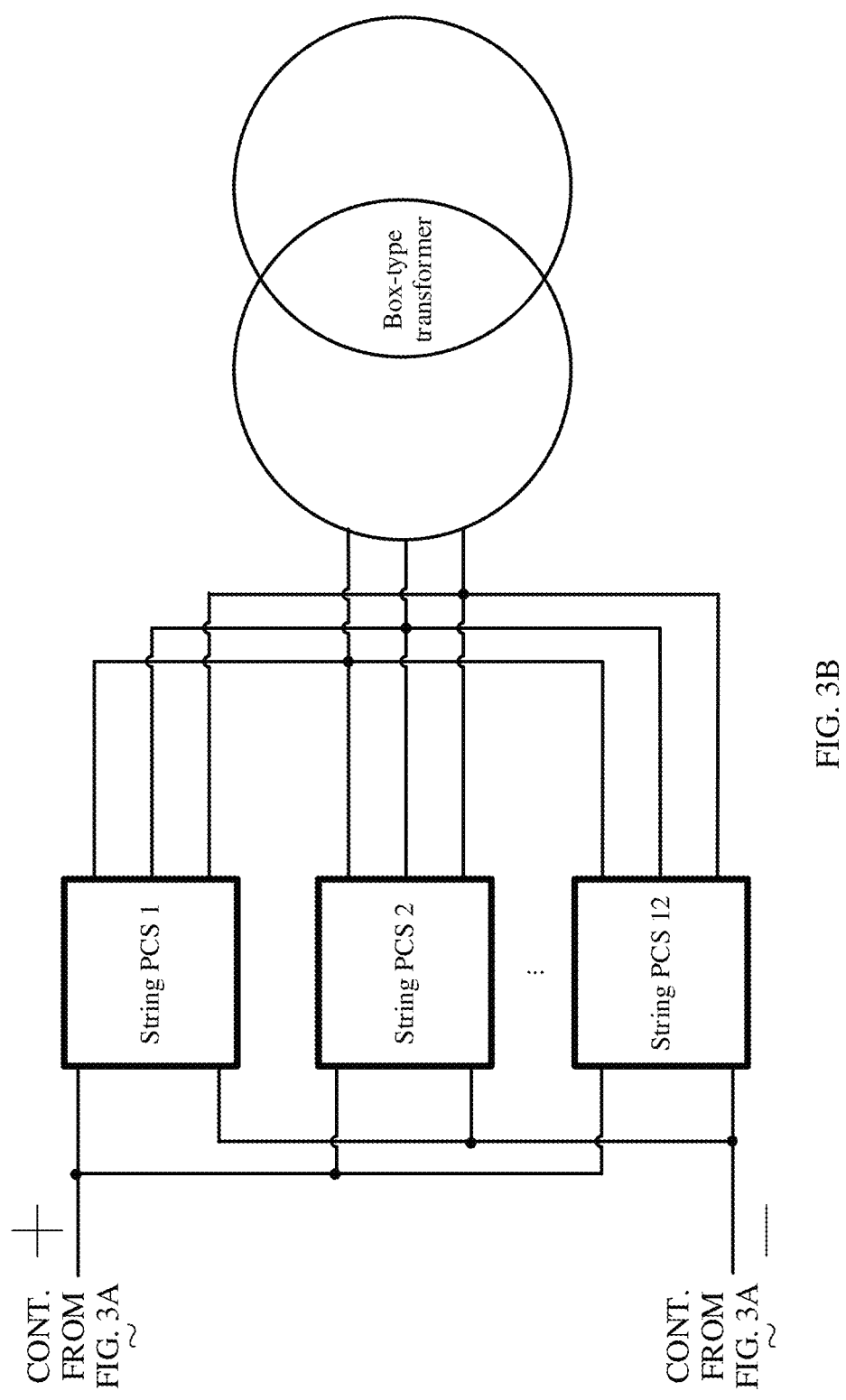
Figure 4:
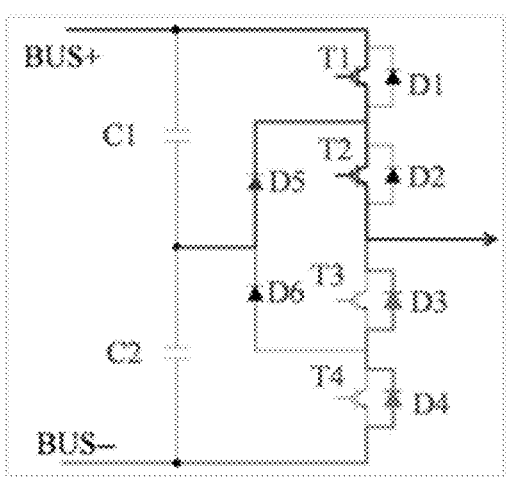
FIG. 4 is a circuit topology diagram of a PCS according to an embodiment.

Refer to FIG. 3A and FIG. 3B and FIG. 4. FIG. 3A and FIG. 3B are a diagram of another energy storage power generation system according to an embodiment. Different from the embodiment in FIG. 2A and FIG. 2B, in the energy storage power generation system shown in the embodiment in FIG. 3A and FIG. 3B, a quantity of PCSs connected in parallel is 12. Therefore, in the energy storage power generation system, a parallel expansion multiple is 0.2*12/1=2.4. This embodiment also has three times an overload capability required by a grid-forming system. Exemplary reasons are as follows: when a power grid is stable, each device in the energy storage power generation system is in a stable operating state. In this state, a power of the PCS is low, and a temperature of the entire system is also low. When the power grid is transiently overloaded, the power of the PCS increases compared with that obtained when the power grid is stable to continuously support the power grid. During the transient overloading of the power grid, the power of the PCS exceeds a rated power of the PCS. However, because the transient overloading of the power grid does not last for a long time, even if a temperature of the PCS increases because the power of the PCS exceeds the rated power of the PCS, the increased temperature is still within an acceptable range of the PCS, so that the energy storage power generation system can still stably support the operation of the power grid. In this embodiment, the parallel expansion multiple of the energy storage power generation system is less than a transient overload multiple, so that a short-time overload capability of the PCS can be fully used, to reduce a quantity of PCSs connected in parallel and reduce costs of the system.

FIG. 4 shows a circuit topology of a PCS according to an embodiment. FIG. 4 is a part of a circuit topology used by the PCS in the embodiment in FIG. 3A and FIG. 3B. The circuit topology is an NPC topology. For example, the NPC topology includes: four switching transistors: a switching transistor T1, a switching transistor T2, a switching transistor T3, and a switching transistor T4, where the four switching transistors are sequentially connected in series and then connected between a BUS+ and a BUS–, and the four switching transistors are further respectively connected in parallel to four body diodes: a body diode D1, a body diode D2, a body diode D3, and a body diode D4; two diodes: a diode D5 and a diode D6, where the two diodes D5 and D6 that are connected in series are further connected in parallel to two ends of the switching transistor T2 and the switching transistor T3 that are connected in series; and two capacitors: a capacitor C1 and a capacitor C2, where the capacitor C1 and the capacitor C2 are connected in series and then connected between the BUS+ and the BUS–, and a connection end of the capacitor C1 and the capacitor C2 is connected to a connection end of the diode D5 and the diode D6; and a connection end of the switching transistor T2 and the switching transistor T3 is used as an output end of the NPC topology.

In this embodiment, to enable the PCS to which the NPC topology is applied to have a strong short-time overload capability, the NPC topology needs to meet the following design: a through-current capability of the diode D5 and a through-current capability of the diode D6 are greater than a through-current capability of the switching transistor T1 and a through-current capability of the switching transistor T4. In a possible implementation, both the diode D5 and the diode D6 are configured as three wafers with through-current capabilities of 1 I, so that D5 and D6 each have a through-current capability of 3 I. In addition, both the switching transistor T1 and the switching transistor T4 are configured as two wafers with through-current capabilities of 1 I, so that T1 and T4 each have a through-current capability of 2 I. In another possible implementation, both the diode D5 and the diode D6 are configured as three wafers with through-current capabilities of 1.5 I, so that D5 and D6 each have a through-current capability of 4.5 I. In addition, both the switching transistor T1 and the switching transistor T4 are configured as three wafers with through-current capabilities of 1 I, so that T1 and T4 each have a through-current capability of 3 I. When a power grid is transiently overloaded, the PCS outputs a low voltage, and compared with a case in which the power grid operates stably, the diode D5 and the diode D6 are in a conducted state for a longer time and have a larger loss. Therefore, the diode D5 and the diode D6 need to have larger through-current capabilities, to increase the short-time overload capability of the PCS.

Refer to FIG. 3A and FIG. 3B and FIG. 9. When the energy storage power generation system shown in FIG. 3A and FIG. 3B is controlled to output an overload power, the following steps are performed:

(1) detect a voltage of the power grid and a frequency of the power grid in real time; and (2) when the voltage of the power grid and the frequency of the power grid each are within a steady-state operating range, limit an absolute value of an active power to not exceeding a reference active power that is set through an interface, and limit an absolute value of a reactive power and an absolute value of a total apparent power to not exceeding a reference apparent power that is set through an interface, where that the voltage of the power grid within a steady-state operating range means that the voltage of the power grid is within a voltage dead band range (that is, [rated voltage–voltage dead band, rated voltage+voltage dead band]) near a rated voltage of an energy storage system; and that the frequency of the power grid is within a steady-state operating range means that the frequency of the power grid is within a frequency dead band range (that is, [rated frequency–frequency dead band, rated frequency+frequency dead band]) near a rated frequency of the energy storage system, and an absolute value of a change rate of the frequency of the power grid is less than a frequency change rate dead band; or when an amplitude of the voltage of the power grid is within a transient-state operating range, limit an active power to not exceeding a maximum active power that is set through an interface, and when the frequency of the power grid is within a transient-state operating range, limit a reactive power and an apparent power to not exceeding a maximum apparent power that is set through an interface, where that the voltage of the power grid within a steady-state operating range means that the voltage of the power grid is within a voltage dead band range (that is, [rated voltage–voltage dead band, rated voltage+voltage dead band]) near a rated voltage of an energy storage system; and that the frequency of the power grid is within a steady-state operating range means that the frequency of the power grid is within a frequency dead band range (that is, [rated frequency–frequency dead band, rated frequency+frequency dead band]) near a rated frequency of the energy storage system, and an absolute value of a change rate of the frequency of the power grid is less than a frequency change rate dead band.

For example, for the energy storage power generation system shown in FIG. 3A and FIG. 3B, a valid value of a rated alternating current line voltage is 800 V, and a rated frequency of a power grid is 50 Hz. It is preset that the voltage dead band is 40 V, the frequency dead band is 0.03 Hz, and the frequency change rate dead band is 0.1 Hz/s, and it is set through the interface that the reference active power is 83.3 kW, the reference apparent power is 83.3 kVA, the maximum active power is 105 kW, and the maximum apparent power is 250 kVA. In this case, when the voltage of the power grid ranges from 760 V to 840 V, the frequency of the power grid ranges from 49.97 Hz to 50.03 Hz, and the absolute value of the change rate of the frequency of the power grid is less than 0.1 Hz/s, each PCS in the energy storage power generation system determines, by detecting the voltage of the power grid and the frequency of the power grid, that the voltage of the power grid and the frequency of the power grid each are within the steady-state operating range. Therefore, each PCS limits the absolute value of the active power of the PCS to not exceeding 83.3 kW, and limits the reactive power and the apparent power of the PCS to not exceeding 83.3 kVA. When the voltage of the power grid is lower than 760 V or higher than 840 V, or the frequency of the power grid is lower than 49.97 Hz or higher than 50.03 Hz, or the absolute value of the change rate of the frequency of the power grid exceeds 0.1 Hz/s, each PCS in the energy storage power generation system determines, by detecting the voltage of the power grid and the frequency of the power grid, that the voltage of the power grid and the frequency of the power grid each are within the transient-state operating range. Therefore, each PCS limits the absolute value of the active power of the PCS to not exceeding 105 KW, and limits the reactive power and the apparent power of the PCS to not exceeding 250 kVA.

Figure 5:
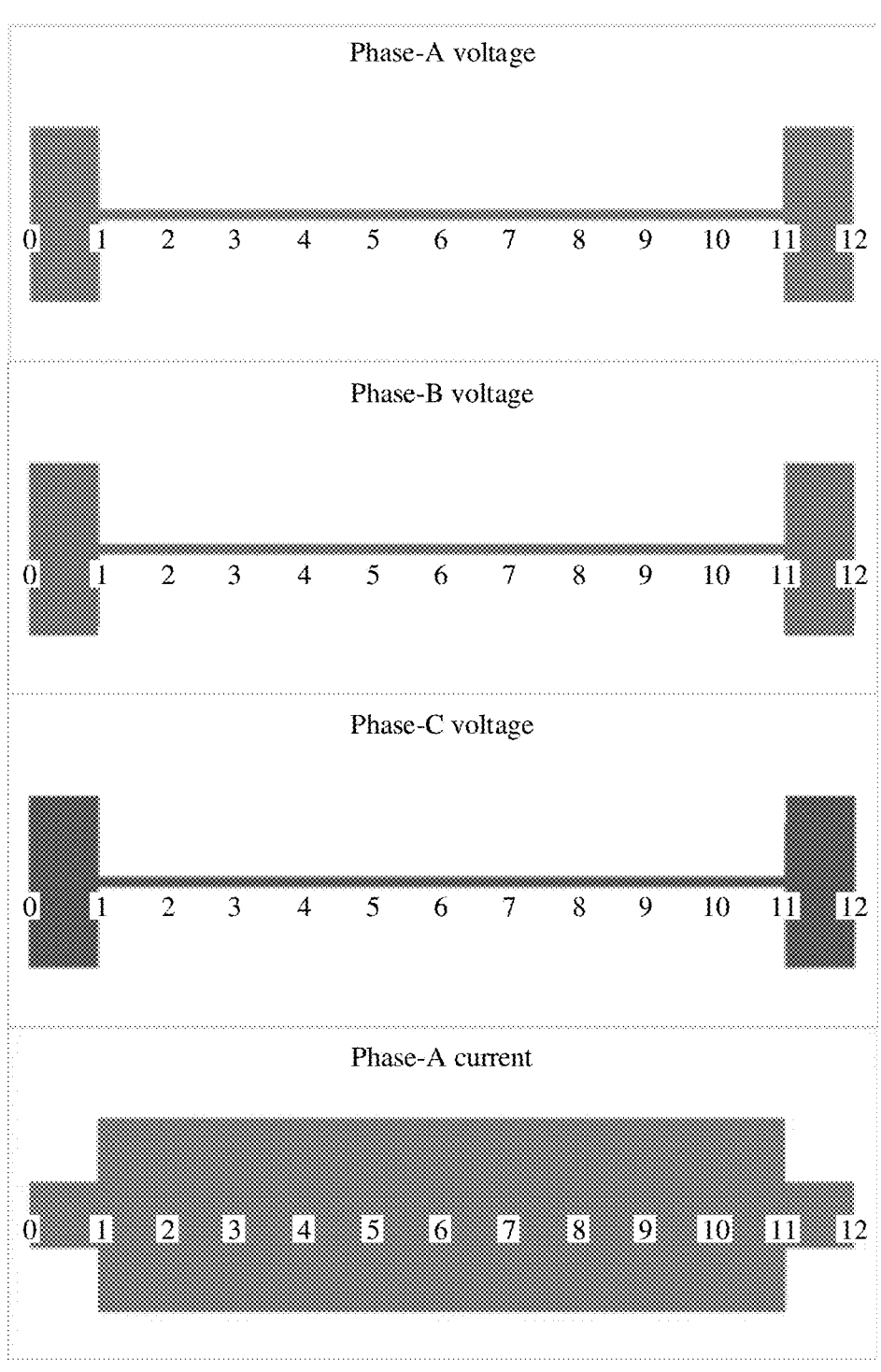
FIG. 5 is a diagram of fault ride-through of an energy storage power generation system in a transient short-circuit fault of a power grid according to an embodiment.
Figure 5:
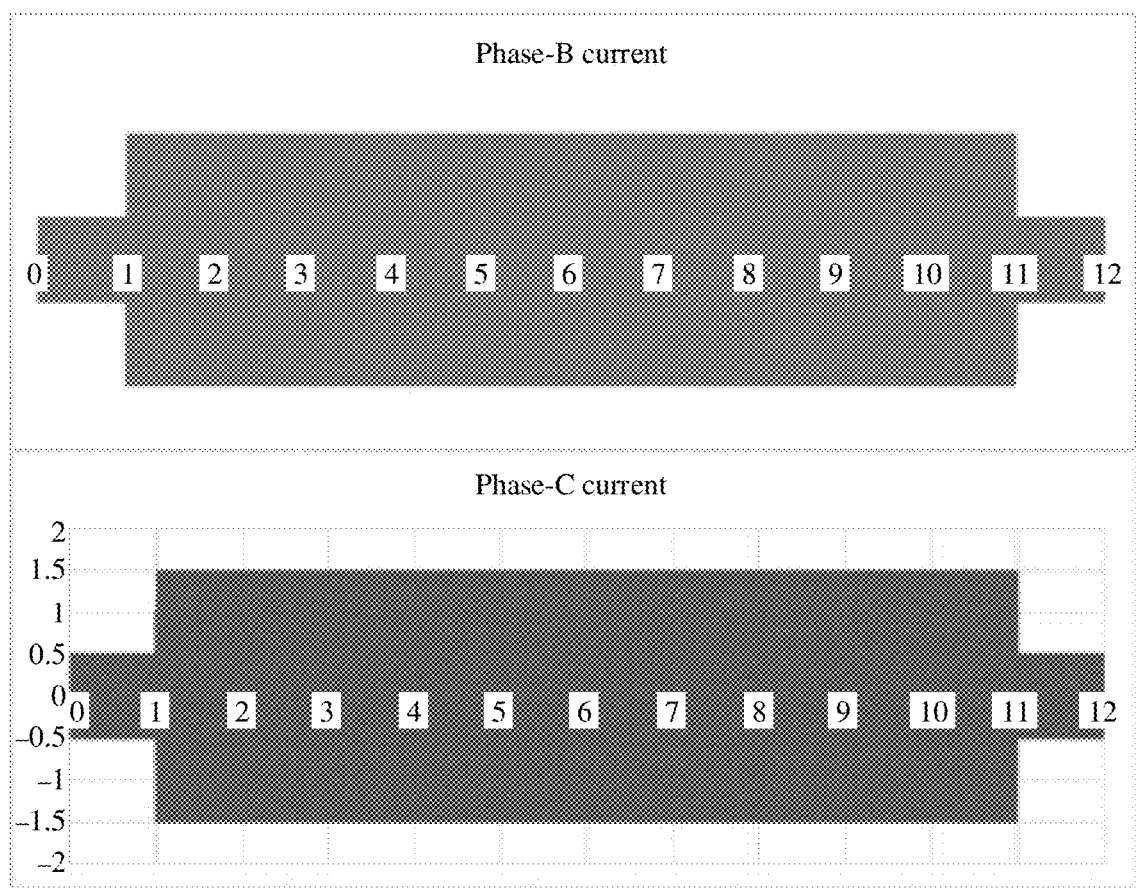

FIG. 5 is a diagram of fault ride-through of an energy storage power generation system in a transient short-circuit fault of a power grid according to an embodiment. Waveforms shown in the first three rows of channels are waveforms of a voltage of the power grid, and waveforms shown in the last three rows of channels are waveforms of a current output by the energy storage power generation system. It can be understood that, after a transient short-circuit overload fault occurs in the power grid, the energy storage power generation system provided in this embodiment can continuously output three times a current within the transient short-circuit fault that is of the power grid and that lasts for 10 s, to support a performance indicator of three times transient overloading of the power grid.

In the foregoing embodiment, the short-time overload capability of the PCS is fully used. When the parallel expansion multiple of the energy storage power generation system is less than the transient overload multiple, the performance indicator of three times the transient overloading of the power grid can still be supported. Based on this principle, the design or implementation idea may be applied to another energy storage power generation system. Details are as follows.

Figure 6A:
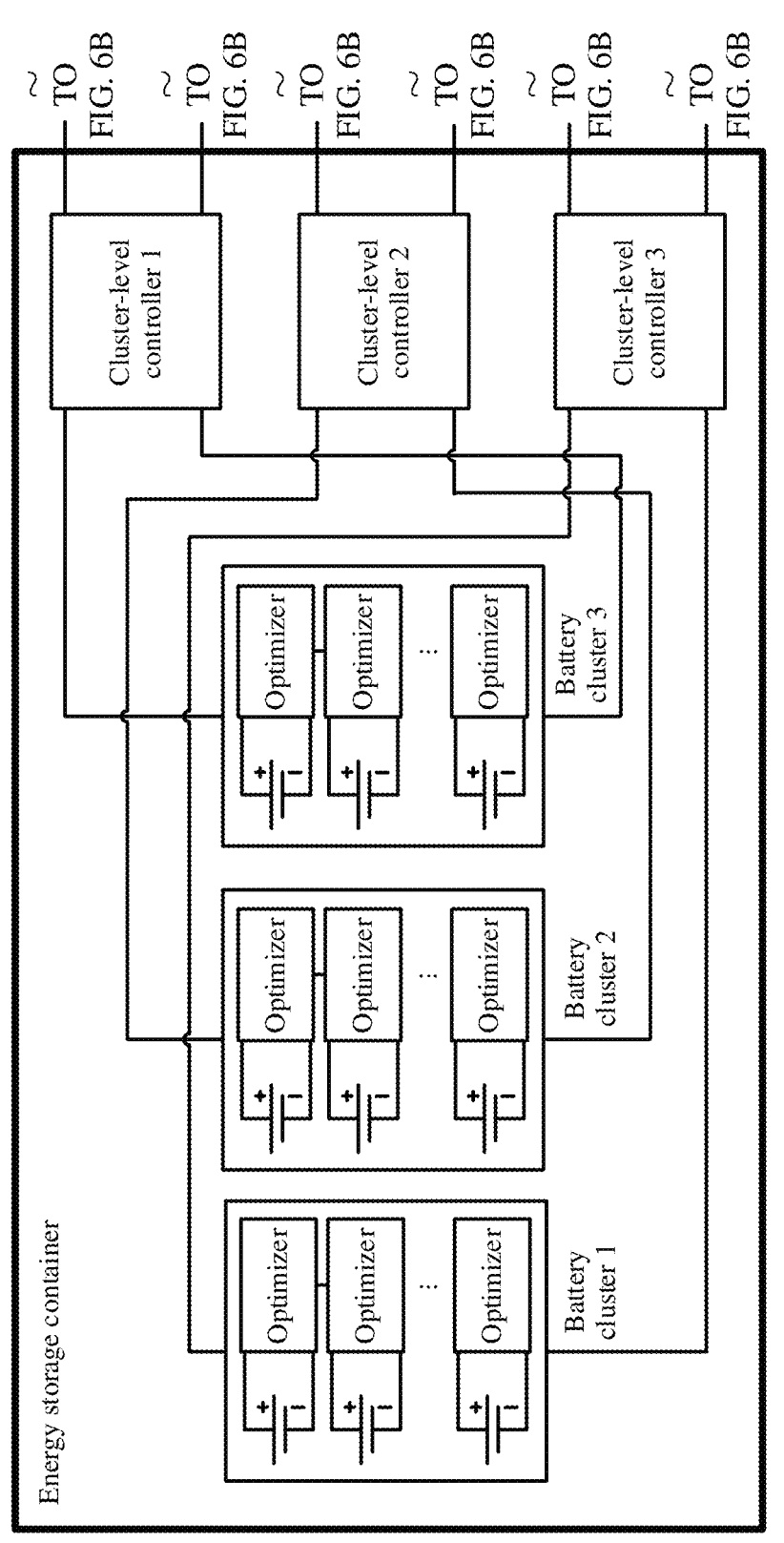
FIG. 6A and FIG. 6B are a diagram of another energy storage power generation system according to an embodiment.
Figure 6B:
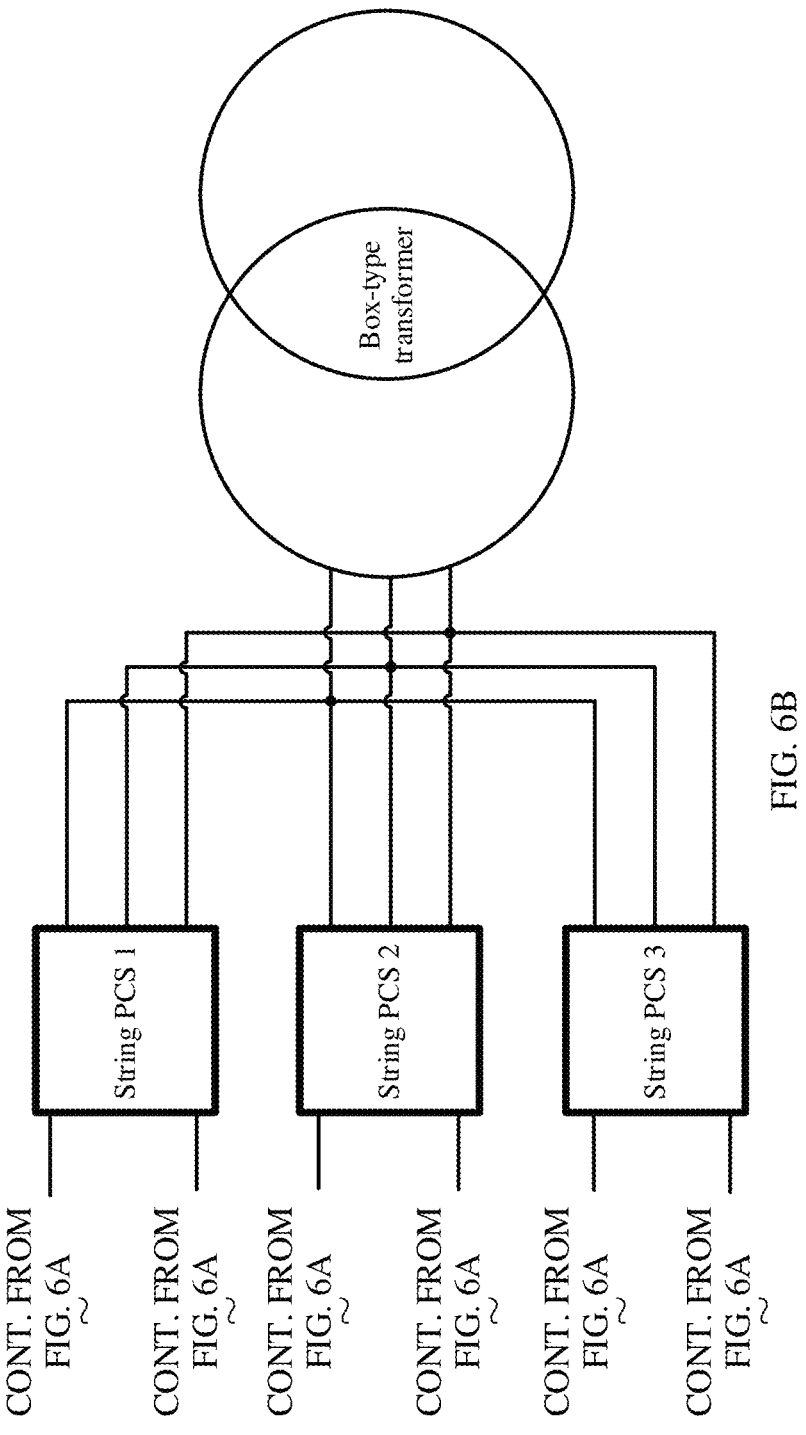

FIG. 6A and FIG. 6B are a diagram of another energy storage power generation system according to an embodiment. Similar to the embodiment in FIG. 1A and FIG. 1B, the energy storage power generation system includes an energy storage container, a plurality of PCSs, and a box-type transformer, and the plurality of PCSs are connected between the energy storage container and the box-type transformer. When the energy storage power generation system discharges to a power grid, the energy storage container, as a direct current power supply, outputs a direct current to the plurality of PCSs. The plurality of PCSs convert the direct current into an alternating current, and then transmits the alternating current to the box-type transformer. In some embodiments, because a voltage of the power grid (not shown in FIG. 6B) is high, the alternating current needs to be boosted by the box-type transformer before being transmitted to the power grid. When the power grid charges the energy storage power generation system, an electric energy conversion process is just opposite to the foregoing discharge process. The box-type transformer, as an alternating current power supply, steps down an alternating current from the power grid and transmits the alternating current to the plurality of PCSs. The plurality of PCSs convert the alternating current into a direct current, and then transmit the direct current to the energy storage container. Then the direct current is stored by a battery in the energy storage container. For example, in the energy storage power generation system provided in this embodiment, the energy storage container includes three battery clusters: a battery cluster 1, a battery cluster 2, and a battery cluster 3, and the energy storage container further includes three cluster-level controllers: a cluster-level controller 1, a cluster-level controller 2, and a cluster-level controller 3. The three battery clusters are respectively connected to the three cluster-level controllers in a one-to-one correspondence, and the three cluster-level controllers are further connected to the plurality of PCSs. For ease of description, a port that is of the cluster-level controller and that is connected to the battery cluster is denoted as a battery cluster side port of the cluster-level controller, and ports that are of the cluster-level controllers and that are connected to the plurality of PCSs are denoted as PCS side ports of the cluster-level controller. Different from the embodiment in FIG. 1A and FIG. 1B, in this embodiment, the battery cluster side ports of the three cluster-level controllers are respectively connected to positive and negative electrodes of the three battery clusters, and the PCS side ports of the three cluster-level controllers are respectively connected to three PCSs. In other words, the energy storage container with the three cluster-level controllers has 2*3-6 ports, and is connected to the PCSs through the six ports. Similar to the embodiment in FIG. 1A and FIG. 1B, alternating-current side ports of the three PCSs are also connected in parallel to form a three-phase output port connected to the box-type transformer.

Similarly, to meet overload capability requirements of different countries or regions for a grid-forming system during grid forming of the energy storage power generation system, a quantity of PCSs in the embodiment in FIG. 6A and FIG. 6B may be expanded. For ease of description, the following also uses an example in which a transient overload multiple is 3 for description.

Figure 7A:
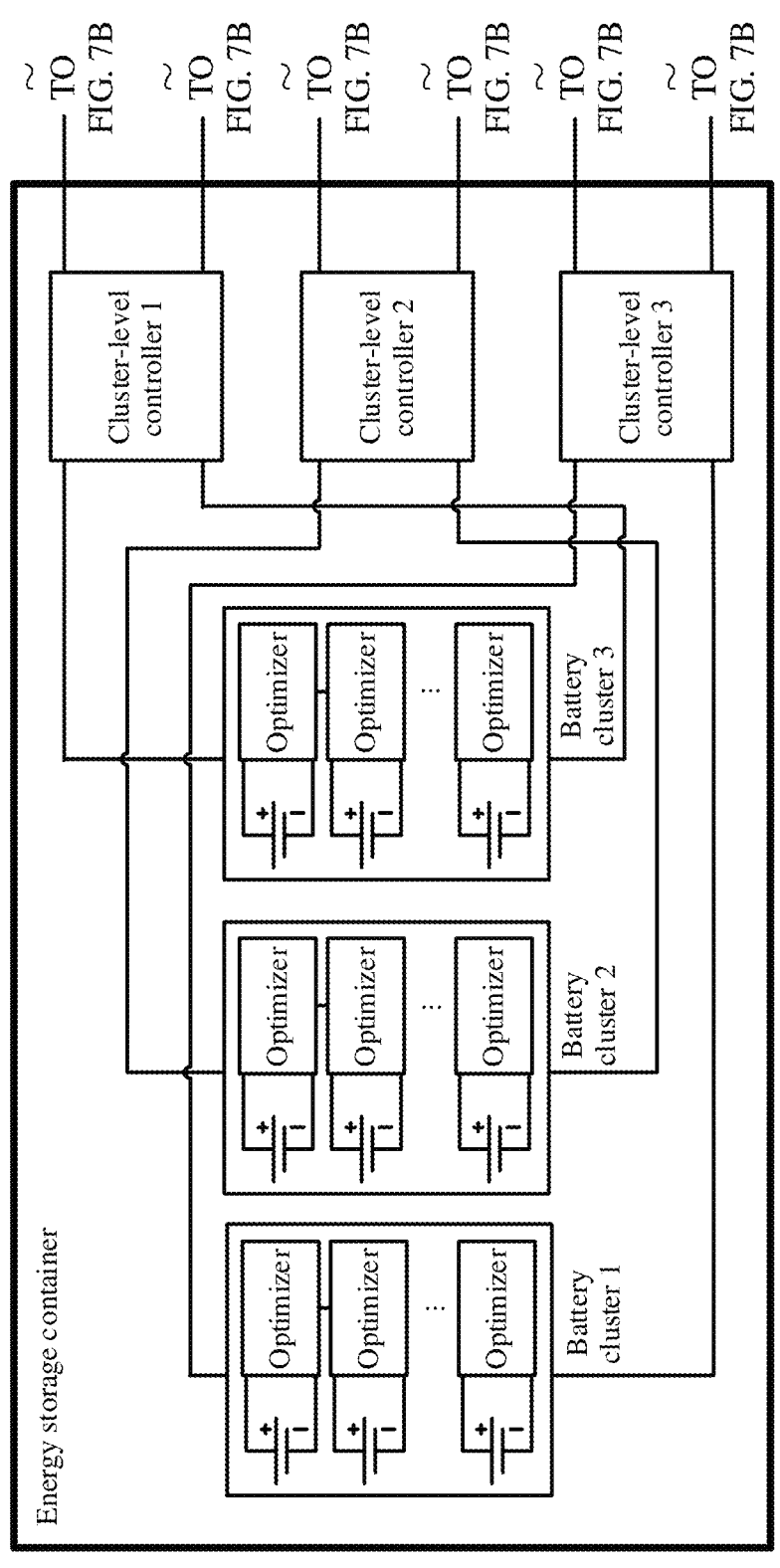
FIG. 7A and FIG. 7B are a diagram of another energy storage power generation system according to an embodiment.
Figure 7B:
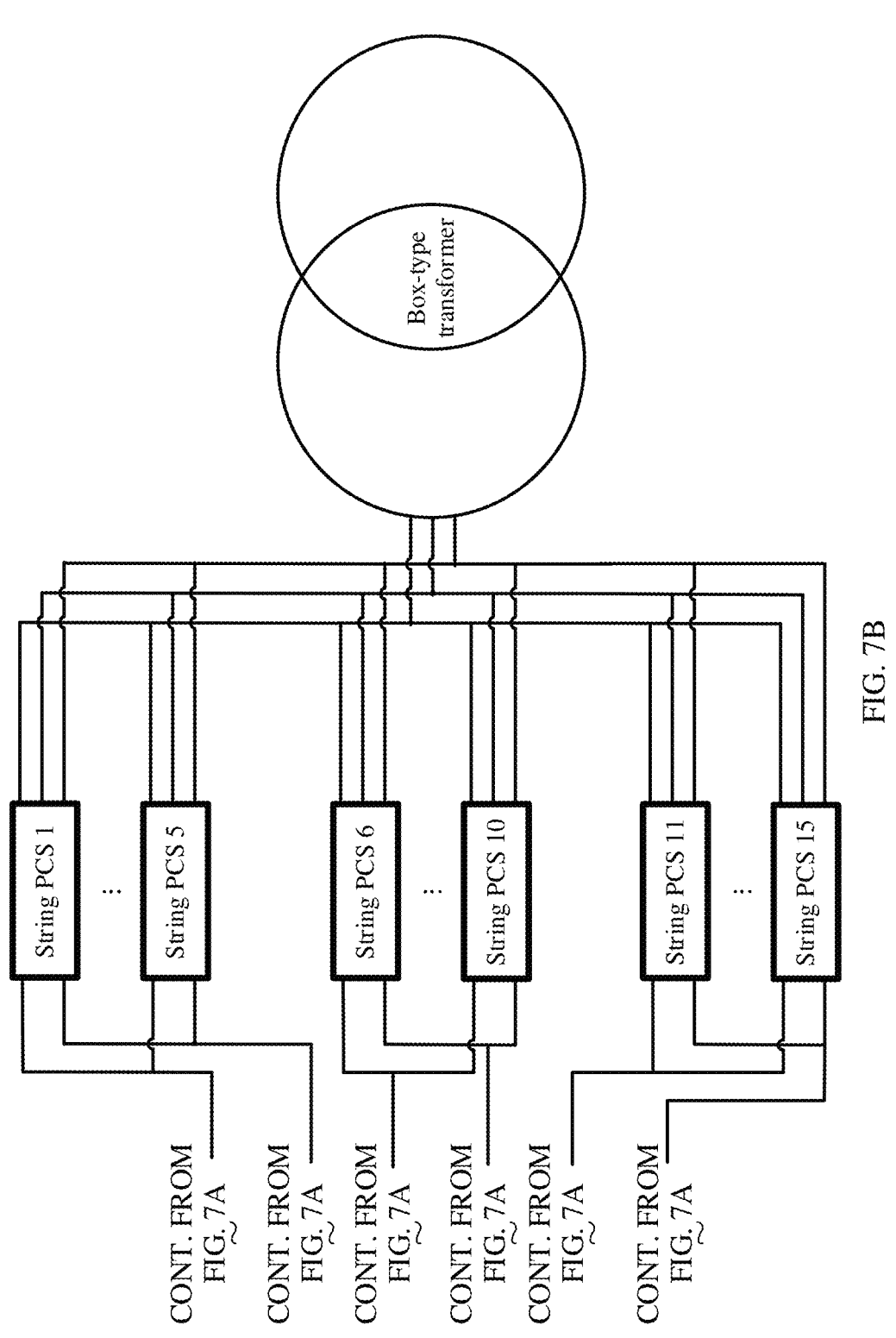

FIG. 7A and FIG. 7B are a diagram of another energy storage power generation system according to an embodiment. For ease of understanding, for example power parameters of devices in this embodiment, refer to the embodiment in FIG. 2A and FIG. 2B. Details are not described herein again. In this embodiment, a PCS side port of each cluster-level controller is connected in parallel to 1*5=5 PCSs. In this case, an energy storage container including three cluster-level controllers is correspondingly connected to 5*3=15 PCSs, and alternating-current sides of the 15 PCSs are all connected in parallel. In this embodiment, a rated power of an energy storage container is 1 MW, a rated power of the PCS is 0.2 MW, and a quantity of PCSs connected in parallel is 15. Therefore, in the energy storage power generation system, a parallel expansion multiple is 0.2*15/1=3, and the parallel expansion multiple is exactly equal to a transient overload multiple. In this case, same as the embodiment in FIG. 2A and FIG. 2B, when a power grid is transiently overloaded, the energy storage power generation system can output three times an overload reactive current. In this embodiment, during the transient overloading of the power grid, a power of the PCS does not exceed the rated power of the PCS. Therefore, this embodiment is also reliable, and there is a good power grid support capability for a transient fault that is of the power grid and that lasts for a long time. In this embodiment, the PCS side port of one cluster-level connector is connected in parallel to the plurality of expanded PCSs, and the alternating-current sides of the PCSs are connected in parallel, so that the PCS of the energy storage power generation system can be conveniently expanded, the energy storage power generation system has an overload capability required for grid forming, and ensures that the rated power of the PCS matches the rated power of the energy storage container, and no additional energy storage container is required.

Similarly, based on a feature of duration of overloading of the power grid, a short-time overload capability of a semiconductor device inside the PCS, and an optimal circuit design of the PCS, the semiconductor device inside the PCS is allowed to operate in an overload state for a short time. In this way, when the power grid is transiently overloaded, the energy storage power generation system can still operate stably and support the power grid. Therefore, the quantity of the PCSs in the energy storage power generation system can be reduced by properly reducing the parallel expansion multiple, and it can still be ensured that the energy storage power generation system has an overload capability of stable operation.

Figure 8A:
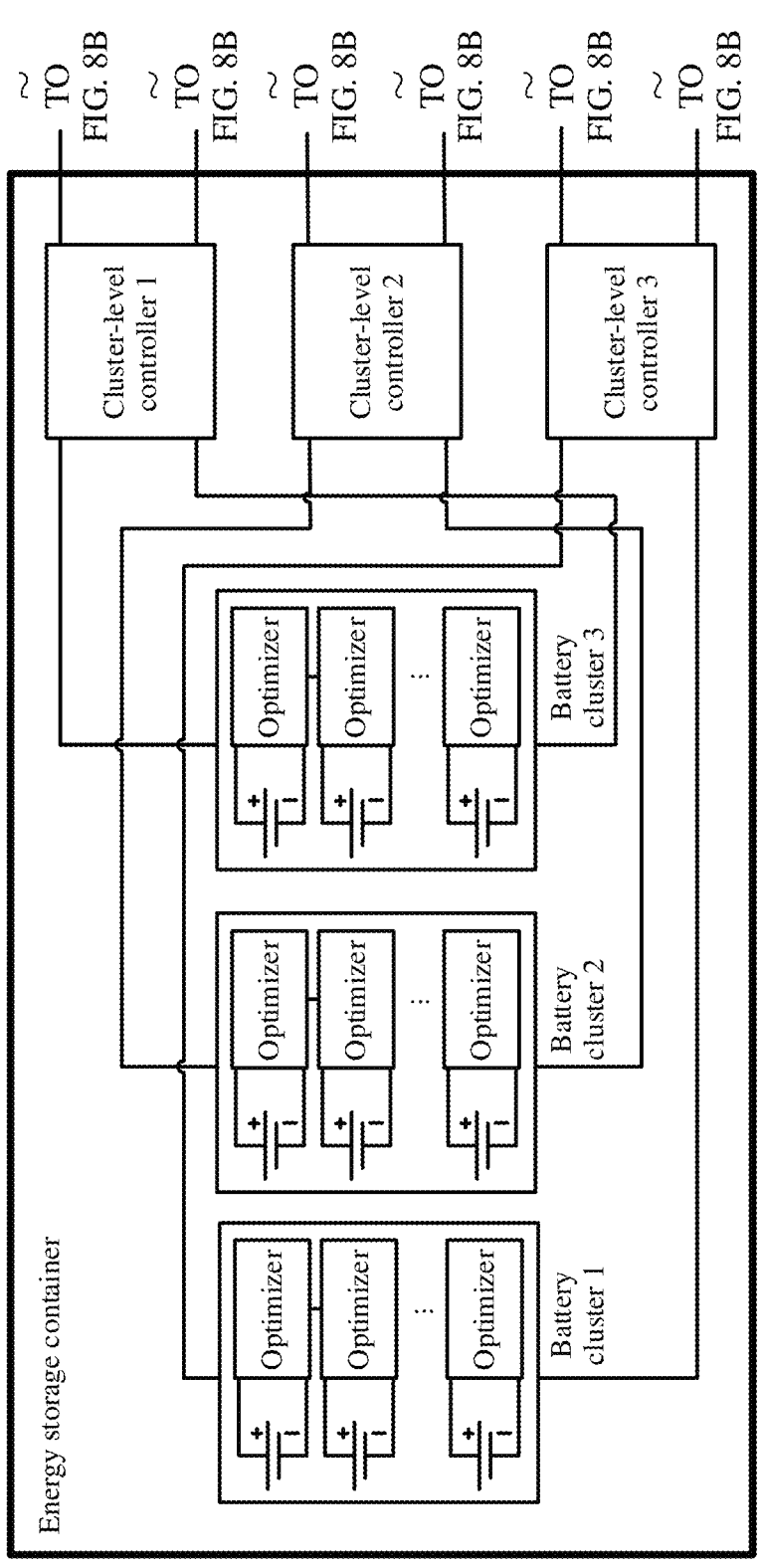
FIG. 8A and FIG. 8B are a diagram of another energy storage power generation system according to an embodiment.
Figure 8B:
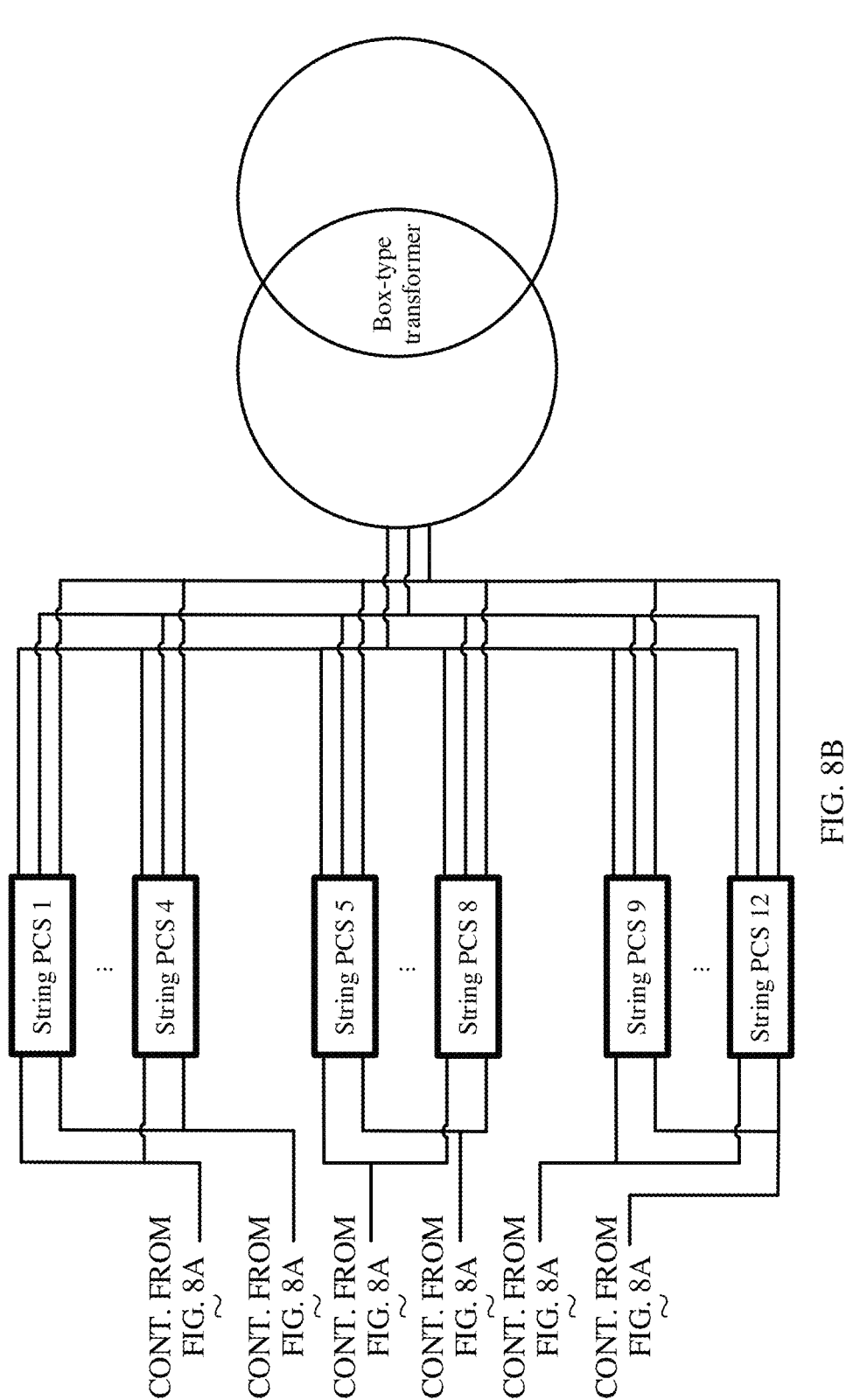

FIG. 8A and FIG. 8B are a diagram of another energy storage power generation system according to an embodiment. In at least a difference from the embodiment in FIG. 7A and FIG. 7B, in this embodiment, a PCS side port of each cluster-level controller is connected in parallel to 1*4=4 PCSs. In this case, an energy storage container including three cluster-level controllers is correspondingly connected to 4*3=12 PCSs. Therefore, in the energy storage power generation system, a parallel expansion multiple is 0.2*12/1=2.4. This embodiment also has three times an overload capability required by a grid-forming system. Exemplary reasons are as follows: when a power grid is stable, each device in the energy storage power generation system is in a stable operating state. In this state, a power of the PCS is low, and a temperature of the entire system is also low. When the power grid is transiently overloaded, the power of the PCS increases compared with that obtained when the power grid is stable to continuously support the power grid. During the transient overloading of the power grid, the power of the PCS exceeds a rated power of the PCS. However, because the transient overloading of the power grid does not last for a long time, even if a temperature of the PCS increases because the power of the PCS exceeds the rated power of the PCS, the increased temperature is still within an acceptable range of the PCS, so that the energy storage power generation system can still stably support the operation of the power grid. In this embodiment, the parallel expansion multiple of the energy storage power generation system is less than a transient overload multiple, so that a short-time overload capability of the PCS can be fully used, to reduce a quantity of PCSs connected in parallel and reduce costs of the system.

The NPC topology shown in the embodiment in FIG. 4 may also be applied to the PCS in the embodiment in FIG. 8A and FIG. 8B, so that the PCS to which the NPC topology is applied has a strong short-time overload capability. Details are not described herein again.

To ensure that the energy storage power generation system can support stable operation of the power grid in both a steady state of the power grid and a transient short-circuit overload fault, the PCS further needs to be controlled. The embodiments provide the following control manners.

For the PCS applied to the embodiment shown in FIG. 3A and FIG. 3B or the embodiment shown in FIG. 8A and FIG. 8B, a user may set an operating parameter of each PCS through a control interface. The operating parameter includes an operating power, and the operating power includes an active power and an apparent power. It should be understood that the control interface may be integrated inside the energy storage container, or may be independently disposed outside the energy storage container, or may be distributed on each PCS. This is not limited.

When the power grid is in the steady state, the quantity of PCSs in the energy storage power generation system is 12, and the rated power of the energy storage container is 1 MW (1000 kW). Therefore, a steady-state maximum active scheduling power of each PCS is set to 1000 kW/12=83.3 kW, the steady-state maximum active scheduling power is a control reference value for each PCS of the energy storage power generation system to perform steady-state active power scheduling when the power grid is in the steady state, and an actual physical meaning of the steady-state maximum active scheduling power is that when the power grid is in the steady state, an active power does not exceed the steady-state maximum active scheduling power when the PCS responds to an upper-level scheduling instruction. This ensures that when the power grid is in the steady state and accepts active power scheduling, an output power of the energy storage power generation system does not exceed 1 MW. When the power grid is in the steady state, the energy storage power generation system does not need to output an apparent power of the transient overload multiple. Therefore, a steady-state maximum apparent scheduling power of each PCS is set to 1000 kVA/12=83.3 kVA, the steady-state maximum apparent scheduling power is a control reference value for each PCS of the energy storage power generation system to perform steady-state apparent power scheduling when the power grid is in the steady state, and an actual physical meaning of the steady-state maximum apparent scheduling power is that when the power grid is in the steady state, an apparent power does not exceed the steady-state maximum apparent scheduling power when the PCS responds to an upper-level scheduling instruction. This ensures that when the power grid is in the steady state and accepts apparent power scheduling, an output power of the energy storage power generation system does not exceed 1 MVA.

When the power grid is transiently overloaded, the quantity of PCSs in the energy storage power generation system is 12, and the rated power of the energy storage container is 1 MW (1000 kW). Therefore, a transient-state maximum active power of each PCS is set to 1000 kW/12=83.3 kW, the transient-state maximum active power is an active power limit value output by each PCS of the energy storage power generation system in response to a transient state of the power grid when a transient frequency or voltage offset occurs in the power grid, and an actual physical meaning of the maximum active power is that when the power grid is transiently overloaded, an active power output by the PCS does not exceed the maximum active power. This ensures that an output power of the energy storage power generation system does not exceed 1 MW when the power grid is transiently overloaded. When the power grid is transiently overloaded, the energy storage power generation system needs to output an apparent power whose multiple is the transient overload multiple, to support operation of the power grid. Therefore, a transient-state maximum apparent power of each PCS is set to 1000 kVA*3/12=250 kVA, the transient-state maximum apparent power is an apparent power limit value output by each PCS of the energy storage power generation system in response to a transient state of the power grid when a transient frequency or voltage offset occurs in the power grid, and an actual physical meaning of the maximum apparent power is that when the power grid is transiently overloaded, an apparent power output by the PCS does not exceed the transient-state maximum apparent power. This ensures that an apparent power of the energy storage power generation system does not exceed 3 MW when the power grid is transiently overloaded, and in addition to ensuring that the energy storage power generation system has three times transient overload performance, ensures that the energy storage power generation system operates within an acceptable range of the energy storage power generation system, thereby ensuring reliability of operation of the entire energy storage power generation system.

It should be understood that the foregoing manner of setting an active power or an apparent power for each PCS may alternatively be replaced with a manner of setting an active current or an apparent current for each PCS because a power and a current can correspond to each other. For brevity, details are not described herein.

The foregoing descriptions are merely specific implementations of the embodiments, but are not intended as limiting. Any variation or replacement readily figured out by a person skilled in the art shall fall within the scope of the embodiments.

The invention claimed is:

1. An energy storage power generation system, comprising:

an energy storage container comprising a battery; and a plurality of power conversion systems, wherein direct-current side ports of the plurality of power conversion systems are connected to the energy storage container, alternating-current side ports of the plurality of power conversion systems are connected in parallel and are configured to connect to a power grid, and the plurality of power conversion systems are configured to implement current conversion between the energy storage container and the power grid;

the plurality of power conversion systems are configured to: enter a steady-state operating mode when a preset condition is met, or enter a transient-state operating mode from the steady-state operating mode when the preset condition is not met;

the preset condition is that the following three conditions are met at the same time, and the three conditions comprise: a voltage of the power grid is within a preset voltage range, a frequency of the power grid is within a preset frequency range, and a change rate of the frequency of the power grid is less than or equal to a frequency change rate threshold;

an active power output by the plurality of power conversion systems in the steady-state operating mode is less than an active power output by the plurality of power conversion systems in the transient-state operating mode, and an apparent power output by the plurality of power conversion systems in the steady-state operating mode is less than an apparent power output by the plurality of power conversion systems in the transient-state operating mode; and a ratio of a sum of rated powers of the plurality of power conversion systems to a rated power of the energy storage container is m, and a ratio of a valid value of a sum of currents output by the plurality of power conversion systems in the transient-state operating mode to a valid value of a sum of currents output by the plurality of power conversion systems at the rated powers in the steady-state operating mode is n, wherein m is less than n, and m is greater than 1.

2. The energy storage power generation system according to claim 1, wherein a circuit of the power conversion system comprises a neutral point clamped (NPC) circuit, and the NPC circuit comprises:

a direct current busbar;

two capacitors that are connected in series between a positive electrode of the direct current busbar and a negative electrode of the direct current busbar;

a switching transistor bridge arm that is connected between the positive electrode of the direct current busbar and the negative electrode of the direct current busbar, and the switching transistor bridge arm comprising two outer switching transistors and a pair of inner switching transistors that are connected in series, the two switching transistors in the pair of inner switching transistors are connected in series, one of the two outer switching transistors is connected between the positive electrode of the direct current busbar and the pair of inner switching transistors, and the other of the two outer switching transistors is connected between the negative electrode of the direct current busbar and the pair of inner switching transistors; and a pair of diodes, wherein the two diodes in the pair of diodes are connected in series, two ends of the pair of diodes are respectively connected to two connection points of the two outer switching transistors and the pair of inner switching transistors, and a midpoint of the pair of diodes is connected to a midpoint of the two capacitors; and a through-current capability of either of the two outer switching transistors is less than a through-current capability of either of the pair of diodes.

3. The energy storage power generation system according to claim 2, wherein each switching transistor in the two outer switching transistors and the pair of inner switching transistors is connected in parallel to one body diode.

4. The energy storage power generation system according to claim 1, wherein the energy storage power generation system comprises a control interface, the control interface is used to set a steady-state maximum active scheduling power and a steady-state maximum apparent scheduling power of each power conversion system, the steady-state maximum active scheduling power is a maximum active power of each power conversion system when the energy storage power generation system is in the steady-state operating mode, and the steady-state maximum apparent scheduling power is a maximum apparent power of each power conversion system when the energy storage power generation system is in the steady-state operating mode.

5. The energy storage power generation system according to claim 4, wherein the steady-state maximum active scheduling power is a ratio of a maximum active scheduling power of the energy storage power generation system to a quantity of the plurality of power conversion systems when the energy storage power generation system is in the steady-state operating mode, and the steady-state maximum apparent scheduling power is a ratio of a maximum apparent scheduling power of the energy storage power generation system to the quantity of the plurality of power conversion systems when the energy storage power generation system is in the steady-state operating mode.

6. The energy storage power generation system according to claim 5, wherein the maximum active scheduling power of the energy storage power generation system or the maximum apparent scheduling power of the energy storage power generation system is the rated power of the energy storage container.

7. The energy storage power generation system according to claim 1, wherein the energy storage power generation system comprises a control interface, the control interface is used to set a transient-state maximum active power and a transient-state maximum apparent power of each power conversion system, the transient-state maximum active power is a maximum active power of each power conversion system when the energy storage power generation system is in the transient-state operating mode, and the transient-state maximum apparent power is a maximum apparent power of each power conversion system when the energy storage power generation system is in the transient-state operating mode.

8. The energy storage power generation system according to claim 7, wherein the transient-state maximum active power is a ratio of a maximum active power of the energy storage power generation system to a quantity of the plurality of power conversion systems when the energy storage power generation system is in the transient-state operating mode, and the transient-state maximum apparent power is a ratio of a maximum apparent power of the energy storage power generation system to the quantity of the plurality of power conversion systems when the energy storage power generation system is in the transient-state operating mode.

9. The energy storage power generation system according to claim 8, wherein the maximum active power of the energy storage power generation system or the maximum apparent power of the energy storage power generation system is the rated power of the energy storage container.

10. The energy storage power generation system according to claim 1, wherein the energy storage container comprises a plurality of battery clusters and a plurality of cluster-level controllers, the plurality of battery clusters are connected to the plurality of cluster-level controllers in a one-to-one correspondence, and the cluster-level controllers are configured to perform direct current/direct current conversion.

11. The energy storage power generation system according to claim 10, wherein each cluster-level controller comprises a battery cluster side port and a power conversion system side port, the battery cluster side port is configured to connect to the battery cluster, and the power conversion system side port is configured to connect to the power conversion system; and battery cluster side ports of the plurality of cluster-level controllers are connected in parallel to each other to form a positive electrode and a negative electrode of the energy storage container, and the direct-current side ports of the plurality of power conversion systems are connected in parallel to each other and are connected to the positive electrode and the negative electrode of the energy storage container.

12. The energy storage power generation system according to claim 10, wherein each cluster-level controller comprises a battery cluster side port and a power conversion system side port, the battery cluster side port is configured to connect to the battery cluster, and the power conversion system side port is configured to connect to the power conversion system; and the plurality of power conversion systems comprise a plurality of groups of power conversion systems, each group of power conversion systems comprises at least two power conversion systems, direct-current side ports of the power conversion systems in each group of power conversion systems are connected in parallel to each other, and the plurality of groups of power conversion systems are respectively connected to the plurality of cluster-level controllers in a one-to-one correspondence.

13. A method for an energy storage power generation system, comprising:

controlling a plurality of power conversion systems to enter a steady-state operating mode when a preset condition is met, or controlling the plurality of power conversion systems to enter a transient-state operating mode from the steady-state operating mode when the preset condition is not met, wherein the preset condition is that three conditions are met at the same time, and the three conditions comprise: a voltage of a power grid is within a preset voltage range, a frequency of the power grid is within a preset frequency range, and a change rate of the frequency of the power grid is less than or equal to a frequency change rate threshold;

an active power output by the plurality of power conversion systems in the steady-state operating mode is less than an active power output by the plurality of power conversion systems in the transient-state operating mode, and an apparent power output by the plurality of power conversion systems in the steady-state operating mode is less than an apparent power output by the plurality of power conversion systems in the transient-state operating mode;

a ratio of a sum of rated powers of the plurality of power conversion systems to a rated power of an energy storage container is m, and a ratio of a valid value of a sum of currents output by the plurality of power conversion systems in the transient-state operating mode to a valid value of a sum of currents output by the plurality of power conversion systems at the rated powers in the steady-state operating mode is n, wherein m is less than n, and m is greater than 1; and the energy storage power generation system comprises the energy storage container and the plurality of power conversion systems, wherein the energy storage container comprises a battery, configured to store electric energy, direct-current side ports of the plurality of power conversion systems are connected to the energy storage container, alternating-current side ports of the plurality of power conversion systems are connected in parallel and are configured to connect to the power grid, and the plurality of power conversion systems are configured to implement current conversion between the energy storage container and the power grid.

14. The control method according to claim 13, wherein a control interface is used to set a steady-state maximum active scheduling power and a steady-state maximum apparent scheduling power of each power conversion system, the steady-state maximum active scheduling power is a maximum active power of each power conversion system when the energy storage power generation system is in the steady-state operating mode, the steady-state maximum apparent scheduling power is a maximum apparent power of each power conversion system when the energy storage power generation system is in the steady-state operating mode, and the energy storage power generation system comprises the control interface.

15. The control method according to claim 14, wherein the steady-state maximum active scheduling power is a ratio of the rated power of the energy storage container to a quantity of the plurality of power conversion systems, and the steady-state maximum apparent scheduling power is a ratio of an apparent scheduling power of the energy storage power generation system to the quantity of the plurality of power conversion systems when the energy storage power generation system is in the steady-state operating mode.

16. The control method according to claim 15, wherein the maximum active scheduling power of the energy storage power generation system or the maximum apparent scheduling power of the energy storage power generation system is the rated power of the energy storage container.

17. The control method according to claim 13, wherein a control interface is used to set a transient-state maximum active power and a transient-state maximum apparent power of each power conversion system, the transient-state maximum active power is a maximum active power of each power conversion system when the energy storage power generation system is in the transient-state operating mode, and the transient-state maximum apparent power is a maximum apparent power of each power conversion system when the energy storage power generation system is in the transient-state operating mode.

18. The control method according to claim 17, wherein the transient-state maximum active power is a ratio of a maximum active power of the energy storage power generation system to a quantity of the plurality of power conversion systems when the energy storage power generation system is in the transient-state operating mode, and the transient-state maximum apparent power is a ratio of a maximum apparent power of the energy storage power generation system to the quantity of the plurality of power conversion systems when the energy storage power generation system is in the transient-state operating mode.

19. The control method according to claim 18, wherein the maximum active power of the energy storage power generation system is the rated power of the energy storage container.

20. The control method according to claim 18, wherein the maximum apparent power of the energy storage power generation system is the rated power of the energy storage container.

* * * * *